United States Patent
Okutani

(10) Patent No.: US 11,132,807 B2
(45) Date of Patent: Sep. 28, 2021

(54) DISPLAY CONTROL APPARATUS AND DISPLAY CONTROL METHOD FOR RECEIVING A VIRTUAL VIEWPOINT BY A USER OPERATION AND GENERATING AND DISPLAYING A VIRTUAL VIEWPOINT IMAGE

(71) Applicant: CANON KABUSHIKI KAISHA, Tokyo (JP)

(72) Inventor: Yasuo Okutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/688,553

(22) Filed: Aug. 28, 2017

(65) Prior Publication Data

US 2018/0061071 A1 Mar. 1, 2018

(30) Foreign Application Priority Data

Sep. 1, 2016 (JP) .............................. JP2016-170932

(51) Int. Cl.
*G06T 7/55* (2017.01)
*H04N 13/117* (2018.01)
*H04N 5/222* (2006.01)
*G06T 15/00* (2011.01)
*G11B 27/10* (2006.01)

(52) U.S. Cl.
CPC .............. *G06T 7/55* (2017.01); *G06T 15/005* (2013.01); *H04N 5/2224* (2013.01); *H04N 13/117* (2018.05); *G11B 27/105* (2013.01)

(58) Field of Classification Search
None
See application file for complete search history.

(56) References Cited

U.S. PATENT DOCUMENTS

| 2002/0113865 | A1* | 8/2002 | Yano ....................... G06T 17/10 348/47 |
| 2003/0160886 | A1 | 8/2003 | Misawa |
| 2005/0018045 | A1 | 1/2005 | Thomas |
| 2008/0036875 | A1 | 2/2008 | Jones et al. |
| 2008/0129825 | A1 | 6/2008 | DeAngelis |
| 2009/0290848 | A1* | 11/2009 | Brown ................... H04N 5/262 386/223 |

(Continued)

FOREIGN PATENT DOCUMENTS

| JP | 2000348165 A | 12/2000 |
| JP | 2008068060 A | 3/2008 |

(Continued)

OTHER PUBLICATIONS

Sara Soueidan, "CSS Overlay Techniques," published on Nov. 7, 2013, retrieved from https://tympanus.net/codrops/2013/11/07/css-overlay-techniques/.*

*Primary Examiner* — Zhengxi Liu
(74) *Attorney, Agent, or Firm* — Canon U.S.A., Inc. IP Division

(57) ABSTRACT

A display control apparatus includes a reception unit configured to receive a virtual viewpoint in accordance with user operation, and a display controller configured to perform control such that a first virtual viewpoint image generated based on the virtual viewpoint and a second virtual viewpoint image having a virtual imaging range larger than a virtual imaging range of the first virtual viewpoint image are displayed on a display screen.

19 Claims, 18 Drawing Sheets

(56) References Cited

U.S. PATENT DOCUMENTS

| | | | |
|---|---|---|---|
| 2012/0011545 A1* | 1/2012 | Doets | H04L 65/80 |
| | | | 725/38 |
| 2012/0162536 A1* | 6/2012 | Sibilsky | G06F 3/033 |
| | | | 348/734 |
| 2013/0063549 A1* | 3/2013 | Schnyder | H04N 13/264 |
| | | | 348/36 |
| 2014/0085203 A1* | 3/2014 | Kobayashi | G01S 19/14 |
| | | | 345/158 |
| 2014/0232818 A1* | 8/2014 | Carr | H04N 5/222 |
| | | | 348/36 |
| 2014/0240452 A1 | 8/2014 | Ki | |
| 2015/0054913 A1 | 2/2015 | Annau | |
| 2015/0172605 A1* | 6/2015 | Anwar | H04N 21/47202 |
| | | | 348/159 |
| 2015/0350606 A1 | 12/2015 | Khanfor | |
| 2016/0035136 A1 | 2/2016 | Sendai | |
| 2016/0286244 A1* | 9/2016 | Chang | H04N 21/26603 |

FOREIGN PATENT DOCUMENTS

| | | |
|---|---|---|
| JP | 2014-215828 A | 11/2014 |
| JP | 2015230682 A | 12/2015 |
| JP | 2016519546 A | 6/2016 |
| WO | 2011/096252 A1 | 8/2011 |

\* cited by examiner

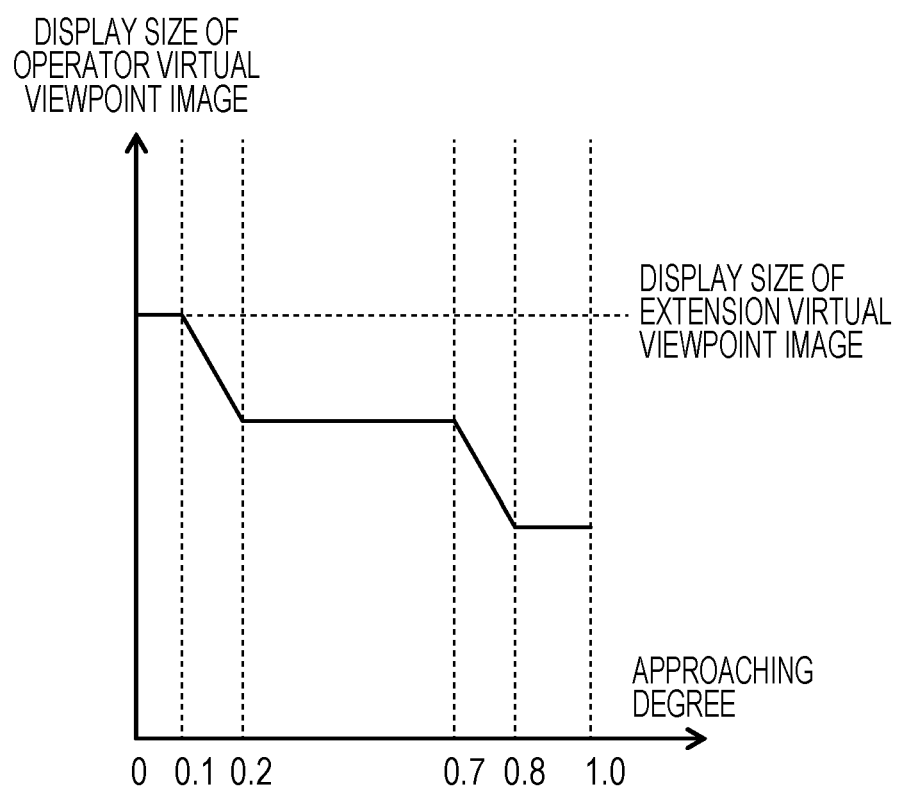

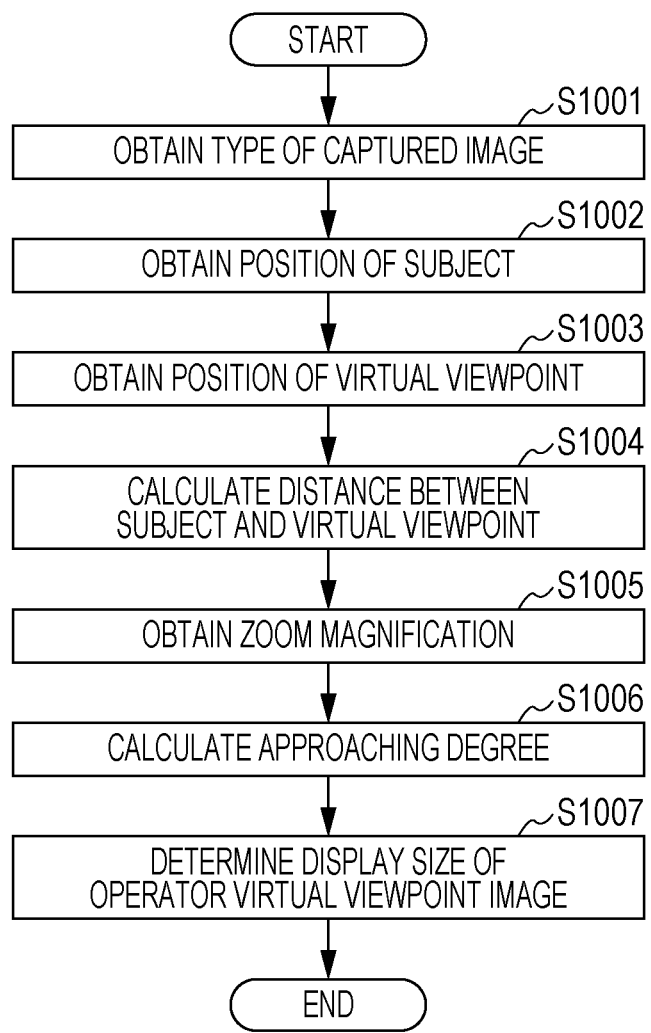

DISPLAY CONTROL APPARATUS AND DISPLAY CONTROL METHOD FOR RECEIVING A VIRTUAL VIEWPOINT BY A USER OPERATION AND GENERATING AND DISPLAYING A VIRTUAL VIEWPOINT IMAGE

BACKGROUND OF THE INVENTION

Field of the Invention

The present invention relates to a display control apparatus, a display control method, and a storage medium.

Description of the Related Art

In recent years, a technique of synchronously capturing images from a plurality of viewpoints by a plurality of cameras installed in different positions and generating a virtual viewpoint image formed from not only the images captured from the camera installation positions but also an arbitrary viewpoint using the plurality of viewpoint images captured by the imaging has attracted attention. Generation and browsing of a virtual viewpoint image based on images of a plurality of viewpoints may be realized by collecting images captured by a plurality of cameras in an image processor, such as a server, performing a process, such as rendering, based on a virtual viewpoint using the image processor, and displaying a virtual viewpoint image in a viewing terminal of a user.

In a service using such a virtual viewpoint image described above, content which is viewed from a viewpoint and which has reality may be created by a video creator using videos obtained by capturing a game of soccer or basketball, for example. Furthermore, if a user who is viewing the content views the game by freely shifting a viewpoint, the user may have more realistic sensation when compared with general captured images. Japanese Patent Laid-Open No. 2014-215828 discloses a technique of generating and displaying an arbitrary virtual viewpoint image using images obtained by capturing a subject by a plurality of cameras installed so as to surround the subject.

However, the technique disclosed in Japanese Patent Laid-Open No. 2014-215828 loses track of a ball or a player if a virtual viewpoint is set too close to the player. It is difficult for an operator who operates a virtual viewpoint to notice a phenomenon happened out of a virtual viewpoint image if determining a next camera angle while viewing the virtual viewpoint image based on the virtual viewpoint operated by the operator. Therefore, a sudden movement of a ball or a player may not be followed, and accordingly, miss shooting may occur or camera work may not be smoothly performed.

SUMMARY OF THE INVENTION

According to an embodiment of the present disclosure, a display control apparatus includes a reception unit configured to receive a virtual viewpoint in accordance with user operation, and a display controller configured to perform control such that a first virtual viewpoint image generated using a captured image based on the virtual viewpoint and a second virtual viewpoint image having a virtual imaging range larger than a virtual imaging range of the first virtual viewpoint image are displayed on a display screen.

Further features of the present invention will become apparent from the following description of exemplary embodiments with reference to the attached drawings.

BRIEF DESCRIPTION OF THE DRAWINGS

FIG. 8 is a diagram illustrating the display-size determination process according to the second embodiment.

FIG. 10 is a flowchart of a display-size determination process according to a second modification.

DESCRIPTION OF THE EMBODIMENTS

Hereinafter, embodiments of the present invention will be described with reference to the accompanying drawings. In the embodiments, a technique of reducing the possibility that an operator who sets a virtual viewpoint loses sight of a specific object will be described.

First Embodiment

Figure 1:
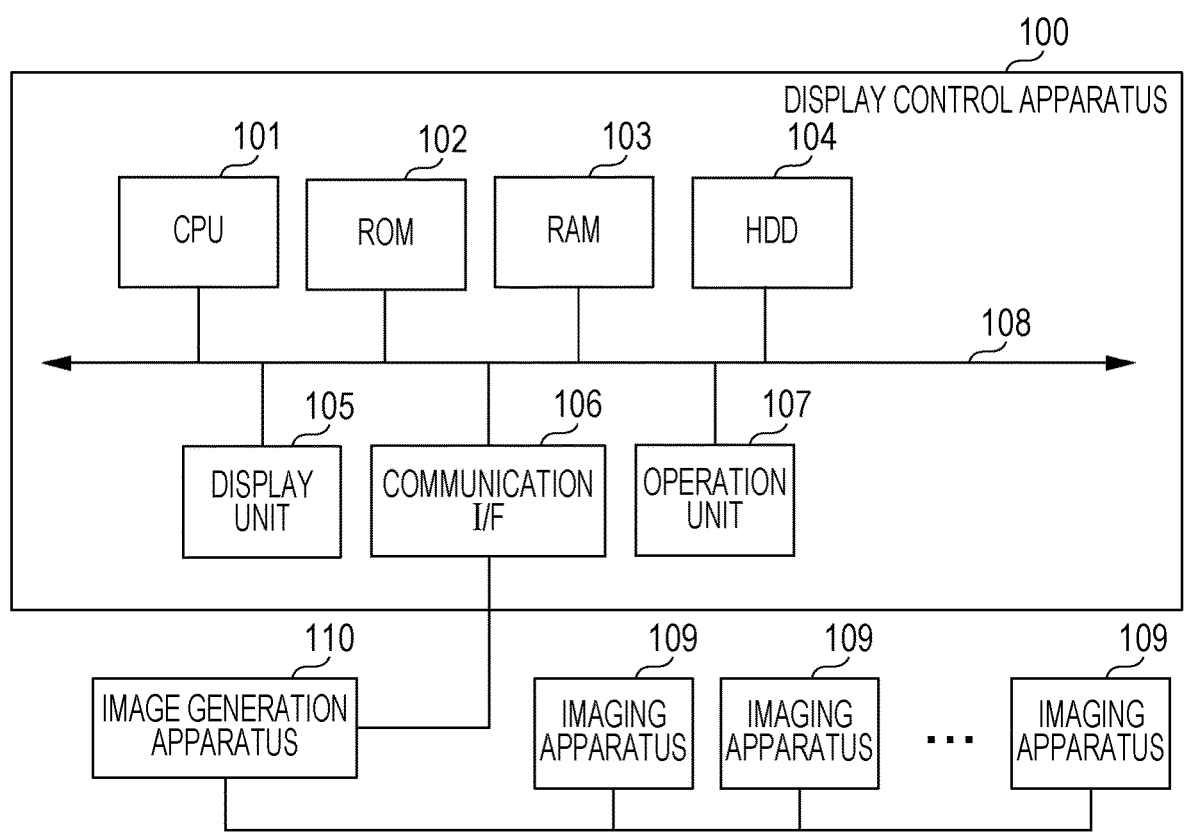
FIG. 1 is a diagram illustrating an entire configuration of an image generation system according to a first embodiment.

FIG. 1 is a diagram illustrating an entire configuration of an image generation system. The image generation system includes a display control apparatus 100, an image generation apparatus 110, and a plurality of imaging apparatuses 109. Each of the imaging apparatuses 109 captures an image and transmits the captured image to the image generation apparatus 110. The image generation apparatus 110 generates a virtual viewpoint image using the captured images received from the imaging apparatuses 109. The display control apparatus 100 displays the virtual viewpoint image and determines a virtual viewpoint for broadcasting relative to the captured images in accordance with an operation performed by the operator. The display control apparatus 100, the image generation apparatus 110, and the imaging apparatuses 109 are connected to one another through a network.

The display control apparatus 100 includes a central processing unit (CPU) 101, a read only memory (ROM) 102, a random access memory (RAM) 103, a hard disk drive (HDD) 104, a display unit 105, a communication interface (I/F) 106, and an operation unit 107. The CPU 101 performs calculations, logical determinations, and the like for various processes and controls the components connected to a system bus 108. The display control apparatus 100 has memories including a program memory and a data memory. The ROM 102 is the program memory which stores control programs to be used by the CPU 101 including various processing procedures described below. The RAM 103 is the data memory which includes a work region for the programs processed by the CPU 101, a data save region for an error process, and a loading area for the control programs. Note that the program memory may be realized by loading a program in the RAM 103 from an external storage apparatus or the like connected to the display control apparatus 100.

The HDD 104 is a hard disk which stores a plurality of electronic data and a plurality of programs according to this embodiment. An external storage apparatus may be used as a device having the same function. Here, the external storage apparatus may be realized using a medium (a recording medium) and an external storage drive which realizes access to the medium, for example. Examples of the medium include a flexible disk (FD), a compact disc (CD)-ROM, a digital versatile disc (DVD), a universal serial bus (USB) memory, magneto-optical disk (MO), and a flash memory. Furthermore, the external storage apparatus may be a server apparatus connected through the network. Note that functions and processes of the display control apparatus 100 described below are realized when the CPU 101 reads the programs stored in the ROM 102 or the HDD 104 and executes the programs.

The display unit 105 is a display device, such as a display, a projector, or a head-mounted display (HMD) which displays a setting screen used to specify a virtual viewpoint. A virtual viewpoint image generated by the image generation apparatus 110 is displayed on the setting screen. The communication I/F 106 is connected to the image generation apparatus 110 or the external storage apparatus in a wired or wireless manner by a general communication method so as to perform bidirectional transmission and reception of information. The operation unit 107 is used by the operator to input a virtual viewpoint in the display control apparatus 100. The operation unit 107 is an input device, such as a joystick, a game pad, a touch panel, a keyboard, or a mouse.

Figure 2:
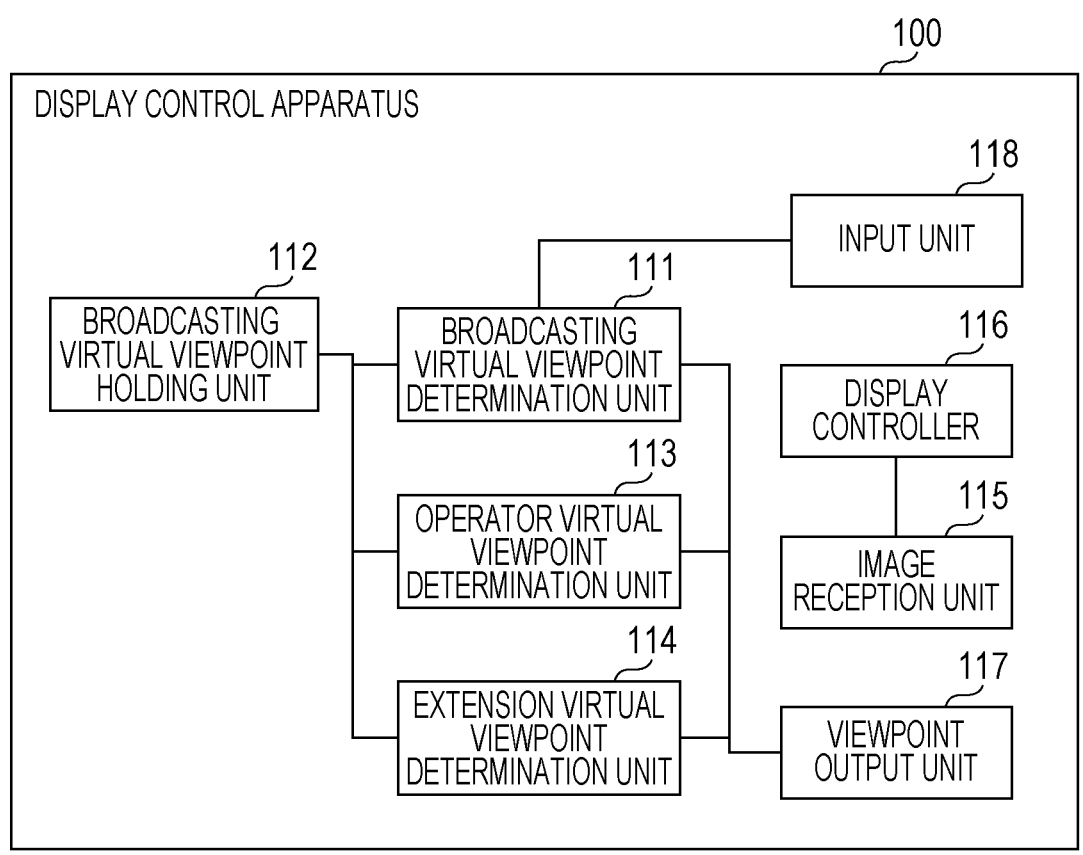
FIG. 2 is a block diagram illustrating a functional configuration of a display control apparatus according to the first embodiment.

FIG. 2 is a block diagram illustrating a functional configuration of the display control apparatus 100. The display control apparatus 100 includes a broadcasting virtual viewpoint determination unit 111, a broadcasting virtual viewpoint holding unit 112, an operator virtual viewpoint determination unit 113, an extension virtual viewpoint determination unit 114, an image reception unit 115, a display controller 116, a viewpoint output unit 117, and an input unit 118. These functional units are realized when the CPU 101 develops the programs stored in the ROM 102 in the RAM 103 and executes processes in accordance with flowcharts described below. Alternatively, part of or all the components illustrated in FIG. 2 may be realized by dedicated hardware. In this case, the CPU 101 controls operation of the dedicated hardware and executes processes in accordance with the flowcharts described below. Hereinafter, the components will be described.

The broadcasting virtual viewpoint determination unit 111 receives a virtual viewpoint which has been input by the operator using the operation unit 107 through the input unit 118. Then the broadcasting virtual viewpoint determination unit 111 newly determines virtual viewpoint information using virtual viewpoint information which has been set before the process is started and the virtual viewpoint received through the input unit 118. The broadcasting virtual viewpoint determination unit 111 holds the determined virtual viewpoint information indicating a broadcasting virtual viewpoint in the broadcasting virtual viewpoint holding unit 112 and outputs the virtual viewpoint information to the viewpoint output unit 117. The broadcasting virtual viewpoint holding unit 112 holds the virtual viewpoint information which indicates the broadcasting virtual viewpoint and which is determined by the broadcasting virtual viewpoint determination unit 111. Here, the virtual viewpoint information includes a 3D position of the virtual viewpoint, rotation angles of three axes, and an angle of view. Although a world coordinate using a center of a soccer field as an origin, for example, is used in this embodiment, other arbitrary coordinate systems may be used. Hereinafter, the virtual viewpoint information is simply referred to as a "virtual viewpoint". The operator may newly specify a virtual viewpoint by an amount of movement from a virtual viewpoint at a time of input (an amount of change of a position and rotation).

The operator virtual viewpoint determination unit 113 determines a virtual viewpoint for the operator in accordance with the broadcasting virtual viewpoint held by the broadcasting virtual viewpoint holding unit 112 and outputs the operator virtual viewpoint to the viewpoint output unit 117. The extension virtual viewpoint determination unit 114 determines an extension virtual viewpoint using the broadcasting virtual viewpoint held by the broadcasting virtual viewpoint holding unit 112 and outputs the extension virtual viewpoint to the viewpoint output unit 117.

As described above, the virtual viewpoint has three types including the broadcasting virtual viewpoint, the operator virtual viewpoint, and the extension virtual viewpoint. The broadcasting virtual viewpoint is used to generate an image to be used in broadcasting. The operator virtual viewpoint is the same as that of the image to be used in broadcasting and has a common angle of view. Therefore, the operator virtual viewpoint determination unit 113 may be replaced by the broadcasting virtual viewpoint determination unit 111. On the other hand, the extension virtual viewpoint is the same as the virtual viewpoint of the image to be used in broadcasting and has an angle of view larger than that for broadcasting (for the operator). Note that the extension virtual viewpoint may be positioned on a rear side of the broadcasting virtual viewpoint (on an optical axis of the virtual viewpoint) and have an angle of view which is the same as that of the broadcasting virtual viewpoint.

The image reception unit 115 receives a virtual viewpoint image generated by the image generation apparatus 110. The display controller 116 displays an operator virtual viewpoint image and an extension virtual viewpoint image on a setting screen used to specify a virtual viewpoint of the display unit 105 such that centers of the images coincide with each other. Although the virtual viewpoint of the operator virtual viewpoint image and the virtual viewpoint of the extension virtual viewpoint image are the same, the angle of view of the extension virtual viewpoint is larger than the angle of view of the operator virtual viewpoint. Therefore, an imaging range of the extension virtual viewpoint image includes an imaging range of the operator virtual viewpoint image and is larger than the imaging range of the operator virtual viewpoint image. Note that, as another example, the angles of view of the operator virtual viewpoint image and the extension virtual viewpoint image may be the same as each other. In this case, the virtual viewpoints of the operator virtual viewpoint image and the extension virtual viewpoint image are located in different positions on the same virtual optical axis.

The display controller 116 displays a frame line indicating a boundary between the operator virtual viewpoint image and the extension virtual viewpoint image. Note that the display controller 116 displays the operator virtual viewpoint image and the extension virtual viewpoint image such that the operator may distinguish the operator virtual viewpoint image and the extension virtual viewpoint image from each other, and a concrete process of the display is not limited to this embodiment. For example, the display controller 116 may display the operator virtual viewpoint image in black and white and the extension virtual viewpoint image in color. Furthermore, the display controller 116 may display the operator virtual viewpoint image and the extension virtual viewpoint image in different alfa values.

The viewpoint output unit 117 outputs the virtual viewpoints determined by the broadcasting virtual viewpoint determination unit 111, the operator virtual viewpoint determination unit 113, and the extension virtual viewpoint determination unit 114 to the image generation apparatus 110 through the communication I/F 106. The input unit 118 detects an amount of a movement of an input device obtained when the operator operates the operation unit 107 and converts the movement amount into a virtual viewpoint.

Note that, as another example, the display control apparatus 100 and the image generation apparatus 110 may be integrally configured. In this case, the display control apparatus 100 may not include the viewpoint output unit 117 and the image reception unit 115. Furthermore, the display control apparatus 100 includes a virtual viewpoint image generation unit and an image output unit which outputs the broadcasting virtual viewpoint image to a broadcasting system.

Figure 3:
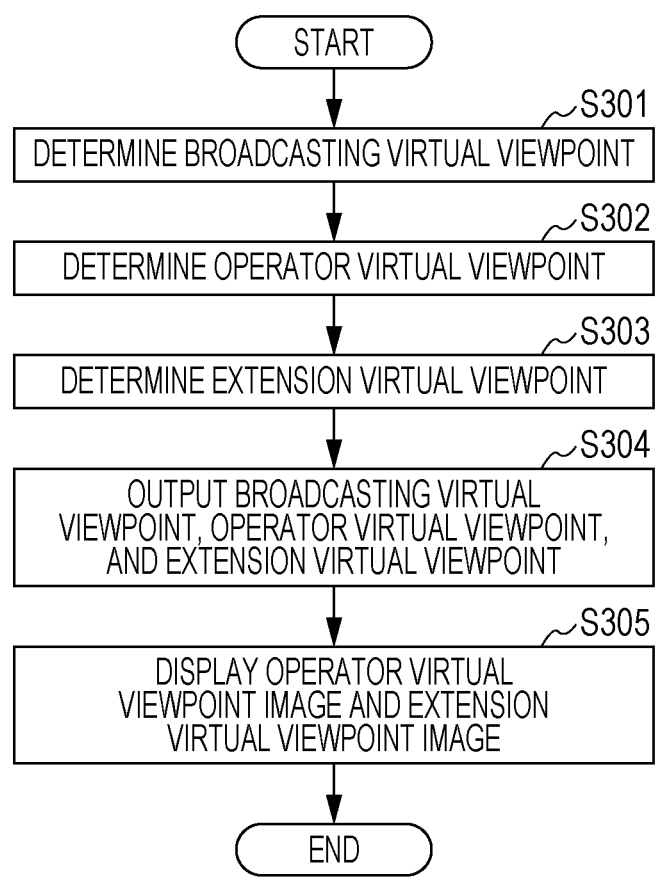
FIG. 3 is a flowchart of information processing according to the first embodiment.

FIG. 3 is a flowchart of information processing performed by the display control apparatus 100. In step S301, the input unit 118 converts operation content input when the operator (user) operates the operation unit 107 into a virtual viewpoint so as to receive the virtual viewpoint (a reception process). The broadcasting virtual viewpoint determination unit 111 newly calculates a broadcasting virtual viewpoint based on the broadcasting virtual viewpoint which has been set when the processing is started and which is held by the broadcasting virtual viewpoint holding unit 112 and the virtual viewpoint received by the input unit 118. The broadcasting virtual viewpoint determination unit 111 records the calculated broadcasting virtual viewpoint in the broadcasting virtual viewpoint holding unit 112. It is assumed that the broadcasting virtual viewpoint which has been set when the processing is started is denoted as follows; (X coordinate, Y coordinate, Z coordinate, X axis rotation, Y axis rotation, Z axis rotation, angle of view)=(5, 10, 100, 0, 45, 30, 30). Furthermore, it is assumed that the virtual viewpoint which is received by the input unit 118 is denoted by (0, 0, −50, 0, 0, 10, 10). In this case, the new broadcasting virtual viewpoint is denoted by (5, 10, 50, 0, 45, 40, 40). Note that the virtual viewpoint received by the input unit 118 in this example indicates that a movement of −50 in the Z axis, rotation in 10 degrees around the Z axis, and enlargement of the angle of view by 10 degrees are to be performed.

In step S302, the operator virtual viewpoint determination unit 113 determines an operator virtual viewpoint based on the new broadcasting virtual viewpoint held by the broadcasting virtual viewpoint holding unit 112. The operator checks an image which is the same as the broadcasting virtual viewpoint image on a terminal device of the operator so as to determine a next operation while viewing the image. Therefore, the broadcasting virtual viewpoint and the operator virtual viewpoint are preferably the same as each other. Therefore, this processing may be omitted and the broadcasting virtual viewpoint may be used when the operator virtual viewpoint image is generated.

In step S303, the extension virtual viewpoint determination unit 114 determines an extension virtual viewpoint based on the new broadcasting virtual viewpoint held by the broadcasting virtual viewpoint holding unit 112. The extension virtual viewpoint determination unit 114 further determines an angle of view of the extension virtual viewpoint (a view angle determination process). In this embodiment, the extension virtual viewpoint determination unit 114 determines a virtual viewpoint which is the same as the operator virtual viewpoint as the extension virtual viewpoint. The extension virtual viewpoint determination unit 114 determines an angle of view which is larger than the angle of view of the operator virtual viewpoint as an angle of view of the extension virtual viewpoint.

The extension virtual viewpoint image preferably has a virtual viewpoint which is the same as the virtual viewpoint of the operator virtual viewpoint image (in terms of a position of the viewpoint and an imaging direction). By this, a problem that an object of a certain region is displayed in both of the operator virtual viewpoint image and the extension virtual viewpoint image when the display controller 116 displays the images such that the centers of the images coincide with one another may be avoided. In addition, a problem that an object in a certain region is not displayed in any of the images may be avoided. On the other hand, the operator may recognize a target object and phenomena out of the imaging range in the broadcasting virtual viewpoint image.

Figure 4A:
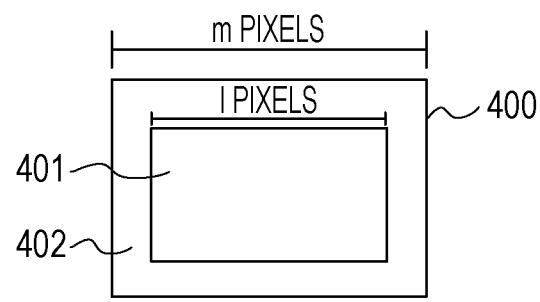
FIGS. 4A and 4B are diagrams illustrating an angle of view according to the first embodiment.

Note that the angle of view of the extension virtual viewpoint image is uniquely determined in accordance with a ratio of a display size of the extension virtual viewpoint image to a display size of the operator virtual viewpoint image. A method for obtaining the angle of view of the extension virtual viewpoint will now be described with reference to FIGS. 4A and 4B. FIG. 4A is a diagram illustrating a setting screen 400 which displays an operator virtual viewpoint image 401 and an extension virtual viewpoint image 402. The display controller 116 displays the extension virtual viewpoint image 402 such that the extension virtual viewpoint image 402 surrounds the operator virtual viewpoint image 401 in a state in which center positions of the operator virtual viewpoint image 401 and the extension virtual viewpoint image 402 coincide with each other. It is assumed here that a display size of the operator virtual viewpoint image 401 is l pixel and a display size of the extension virtual viewpoint image 402 is m pixels. In this case, m is larger than l, and the display controller 116 performs display control such that the extension virtual viewpoint image 402 surrounds the operator virtual viewpoint image 401.

Figure 4B:
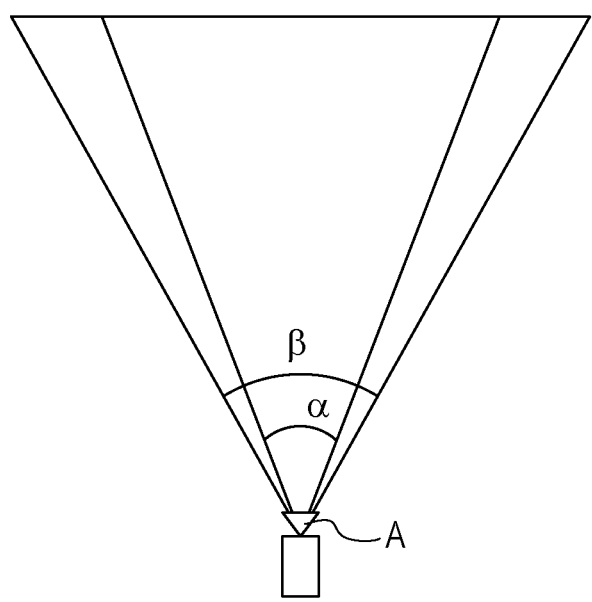

FIG. 4B is a diagram illustrating the relationship between the angle of views of the extension virtual viewpoint and the operator virtual viewpoint. A point A serves as the operator virtual viewpoint and the extension virtual viewpoint and is commonly used. Assuming that the angles of view of the operator virtual viewpoint and the extension virtual viewpoint are denoted by "α" and "β", respectively, the relationship of Expression 1 is obtained.

$$l:m = \tan(\alpha/2) : \tan((\beta/2) \qquad \text{Expression 1}$$

Note that the operator inputs the value "α". According to Expression 1, an angle of view β may be obtained in accordance with Expression 2. Here, "m/l" indicates a display size ratio.

$$\beta = 2 * \arctan(\tan(\alpha/2) * m/l) \qquad \text{Expression 2}$$

Although the description has been made using the number of pixels in a horizontal direction for simplicity of the description, the number of pixels in a vertical direction may be similarly calculated.

Referring back to FIG. 3, the CPU 101 proceeds to step S304 after the process in step S303.

In step S304, the viewpoint output unit 117 outputs the broadcasting virtual viewpoint, the operator virtual viewpoint, and the extension virtual viewpoint to the image generation apparatus 110. The image generation apparatus 110 generates a broadcasting virtual viewpoint image, an operator virtual viewpoint image, and an extension virtual viewpoint image to be output to the image reception unit 115 based on the broadcasting virtual viewpoint, the operator virtual viewpoint, and the extension virtual viewpoint. Note that the broadcasting virtual viewpoint image is transmitted to a broadcasting system (not illustrated). The image reception unit 115 receives the operator virtual viewpoint image and the extension virtual viewpoint image generated by the image generation apparatus 110 and proceeds to step S305.

In step S305, the display controller 116 performs control so as to display the operator virtual viewpoint image and the extension virtual viewpoint image received by the image reception unit 115 on the setting screen. This process is an example of a display control process of displaying a first virtual viewpoint image and a second virtual viewpoint image having a virtual imaging range larger than that of the first virtual viewpoint image on a display screen. The display controller 116 simultaneously displays both of the extension virtual viewpoint image and the operator virtual viewpoint image such that a center of the extension virtual viewpoint image and a center of the operator virtual viewpoint image coincide with each other as illustrated in FIG. 4A. In this case, the display controller 116 performs control such that the operator virtual viewpoint image is displayed on a front side. Furthermore, the display controller 116 renders a heavy line on a boundary between the operator virtual viewpoint image 401 and the extension virtual viewpoint image 402 so that the operator virtual viewpoint image 401 and the extension virtual viewpoint image 402 are distinguished from each other.

In this way, the information processing performed by the display control apparatus 100 is terminated. The display control apparatus 100 may generate the broadcasting virtual viewpoint image in real time in accordance with an operation of the operator by repeatedly performing the process from step S301 to step S305 described above.

Note that, although the operator virtual viewpoint is determined in step S302 in this embodiment, this step may be omitted since the operator virtual viewpoint and the broadcasting virtual viewpoint are the same as each other. In this case, the broadcasting virtual viewpoint is used instead of the operator virtual viewpoint in the other processes. Furthermore, a portion of the extension virtual viewpoint image is not displayed since the operator virtual viewpoint image is displayed on the front side in step S305. Therefore, the display control apparatus 100 may cause the image generation apparatus 110 to generate only an image of a portion to be displayed of the extension virtual viewpoint image. By this, reduction of a calculation amount and a communication load may be realized.

As described above, the display control apparatus 100 of this embodiment simultaneously displays the operator virtual viewpoint image and the extension virtual viewpoint image on the setting screen for specifying a virtual viewpoint. Furthermore, optical axes of the virtual viewpoints of the operator virtual viewpoint image and the extension virtual viewpoint image coincide with each other, and the operator virtual viewpoint image and the extension virtual viewpoint image are arranged such that centers of the images coincide with each other. Accordingly, distortion in a boundary portion between the extension virtual viewpoint image and the operator virtual viewpoint image is suppressed and both of the images may be seamlessly displayed. By this, the operator may easily notice a phenomenon which occurs around the operator virtual viewpoint image and may follow a sudden movement of a ball or a player. Consequently, the operator less misses shooting of a subject at a time of operation of a virtual viewpoint, and a smooth camerawork may be realized.

As a first modification, centers of an extension virtual viewpoint image and an operator virtual viewpoint image may not coincide with each other in a display screen as long as the display controller 116 displays the extension virtual viewpoint image around the operator virtual viewpoint image.

As a second modification, the relationship between an extension virtual viewpoint image and an operator virtual viewpoint image is not limited to the foregoing embodiment as long as the extension virtual viewpoint image has a virtual imaging range larger than that of the operator virtual viewpoint image. For example, positions of virtual viewpoints of the images or imaging directions of the images are not necessarily the same as each other. Note that the virtual imaging range of the extension virtual viewpoint image preferably includes the virtual imaging range of the operator virtual viewpoint image.

Furthermore, as a third modification, display sizes of an operator virtual viewpoint image and an extension virtual viewpoint image may not be fixed. In this case, an extension virtual viewpoint determination unit 114 may determine an angle of view of the extension virtual viewpoint image based on an angle of view of the operator virtual viewpoint image without taking a display size ratio of the images into consideration.

As a fourth modification, an image generation system may generate an extension virtual viewpoint image from an operator virtual viewpoint image by changing a virtual viewpoint image instead of an angle of view. Specifically, in this case, a display control apparatus 100 determines an angle of view of the operator virtual viewpoint image as an angle of view of the extension virtual viewpoint image and determines a rear position relative to an operator virtual viewpoint as an extension virtual viewpoint. The term "rear position" indicates a position in a direction opposite to a virtual imaging direction of the operator virtual viewpoint image. Furthermore, the image generation system may generate the extension virtual viewpoint image by changing both of a virtual viewpoint and an angle of view. Note that, in any case, the angle of view and the virtual viewpoint of the extension virtual viewpoint image are controlled so that a virtual viewpoint image which is the same as the extension virtual viewpoint image described in the foregoing embodiment is generated.

Second Embodiment

Next, an image generation system according to a second embodiment will be described. Although the display size of the operator virtual viewpoint image is fixed in the first embodiment, a display control apparatus 100 according to the second embodiment appropriately changes a display size of an operator virtual viewpoint image. In a case of a wide angle in which an entire field is to be captured, for example, an extension virtual viewpoint image is less required. However, in a case of an angle for zooming in a specific player, it is difficult for an operator to notice a phenomenon which occurs around an operator virtual viewpoint image. This is because an angle of view of an extension virtual viewpoint image is also reduced in accordance with the angle of view of the operator virtual viewpoint image. This is expressed in Expression 2 in the first embodiment. Accordingly, in the image generation system of this embodiment, a display size of an operator virtual viewpoint image is changeable.

Figure 5:
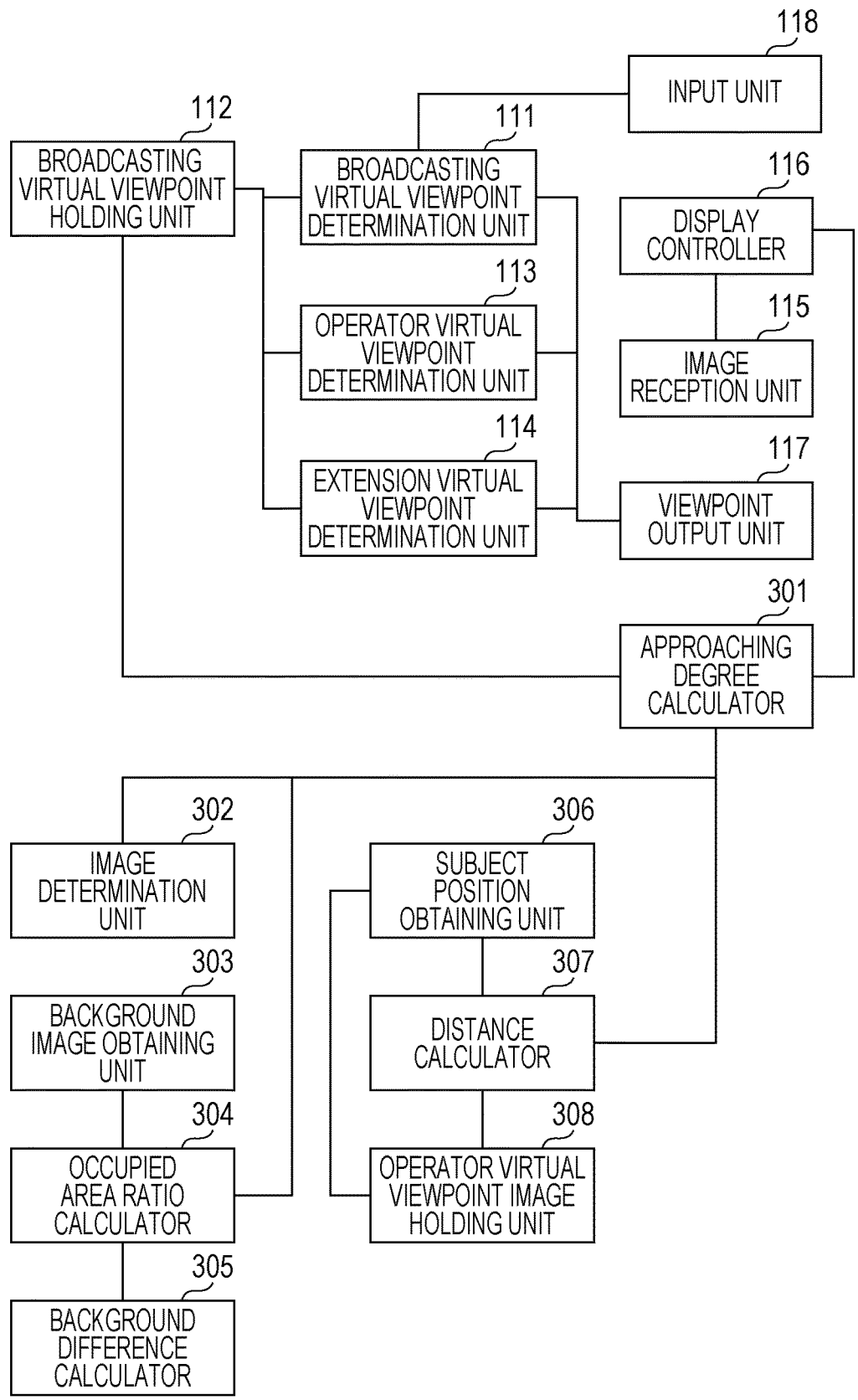
FIG. 5 is a diagram illustrating a functional configuration of a display control apparatus according to a second embodiment.

Hereinafter, the image generation system of the second embodiment will be described mainly in portions different from the image generation system according to the first embodiment. FIG. 5 is a functional configuration of the display control apparatus 100 according to the second embodiment. Modules having functions the same as those in FIG. 1 are denoted by reference numerals the same as those illustrated in FIG. 1, and descriptions thereof are omitted. In FIG. 5, an approaching degree calculator 301 calculates a degree of approach between a virtual viewpoint and a subject by a scale of approaching degree. As a physical distance between a virtual viewpoint and a subject becomes shorter, the approaching degree becomes larger, whereas as the physical distance becomes longer, the approaching degree becomes smaller. Furthermore, as an occupied area ratio of a subject relative to a virtual viewpoint image becomes larger, the approaching degree becomes larger, whereas as the occupied area ratio becomes smaller, the approaching degree becomes smaller. Although a case where an approaching degree is scaled up from 0 to 1 is described in this embodiment, the present technique is not limited to this and an arbitrary value may be used or control of a display size may be performed without using the scale of an approaching degree.

An image determination unit 302 determines an image type. In this embodiment, the image type indicates a type of a game which is a target of image capturing. The type of a game may be given in advance or input by an operator. As another example, the display control apparatus 100 may estimate a type of a game from a captured image using a recognition technique.

A background image obtaining unit 303 obtains a background image in a certain virtual viewpoint. Here, the background image corresponds to a virtual viewpoint image obtained in a state in which objects which move around in real time, such as players or balls, do not exist. It is assumed that an imaging apparatus 109 captures a plurality of images before a game is started and an image generation apparatus 110 holds the images as background images. By this, the image generation apparatus 110 may generate the background image in an arbitrary virtual viewpoint.

An occupied area ratio calculator 304 calculates an occupied area ratio of the subject in a virtual viewpoint image. A background difference calculator 305 calculates a difference between the virtual viewpoint image and the background image. A subject position obtaining unit 306 obtains a position of the subject by a position sensor attached to the subject and a position recognition based on image recognition. A distance calculator 307 calculates a distance between the virtual viewpoint and the subject using a position of the virtual viewpoint and a position of the subject. An operator virtual viewpoint image holding unit 308 holds operator virtual viewpoint images.

Figure 6:
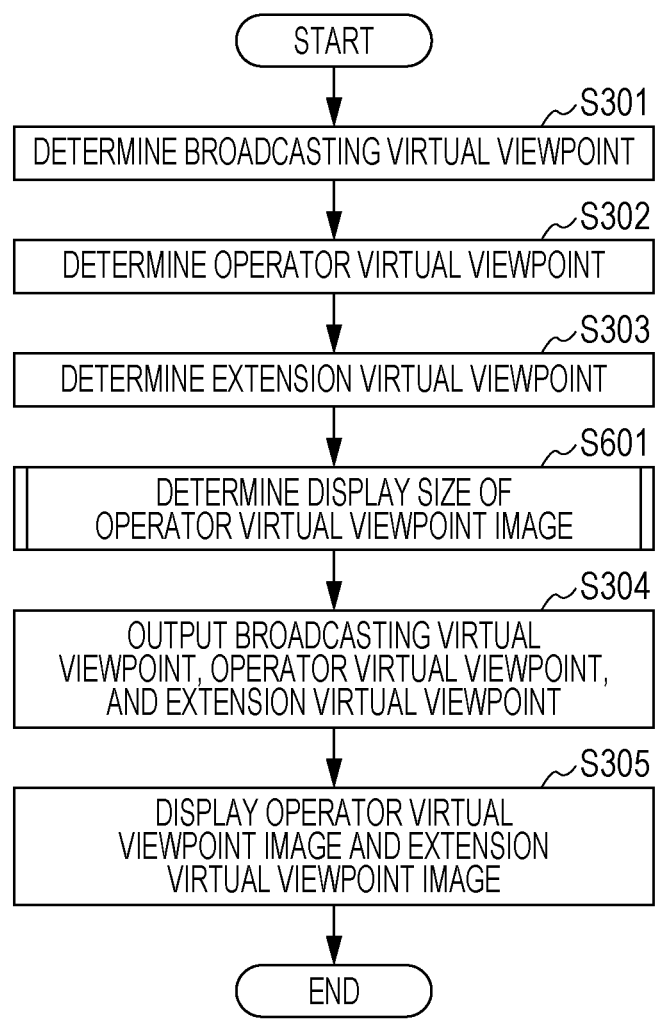
FIG. 6 is a flowchart of information processing according to the second embodiment.

FIG. 6 is a flowchart of information processing according to the second embodiment. Processes which are the same as those illustrated in FIG. 3 are denoted by reference numerals which are the same as those illustrated in FIG. 3, and descriptions thereof are omitted. A CPU 101 proceeds to step S601 after a process in step S303. In step S601, a display controller 116 determines a display size of the operator virtual viewpoint image, and thereafter, the process proceeds to step S304.

Figure 7:
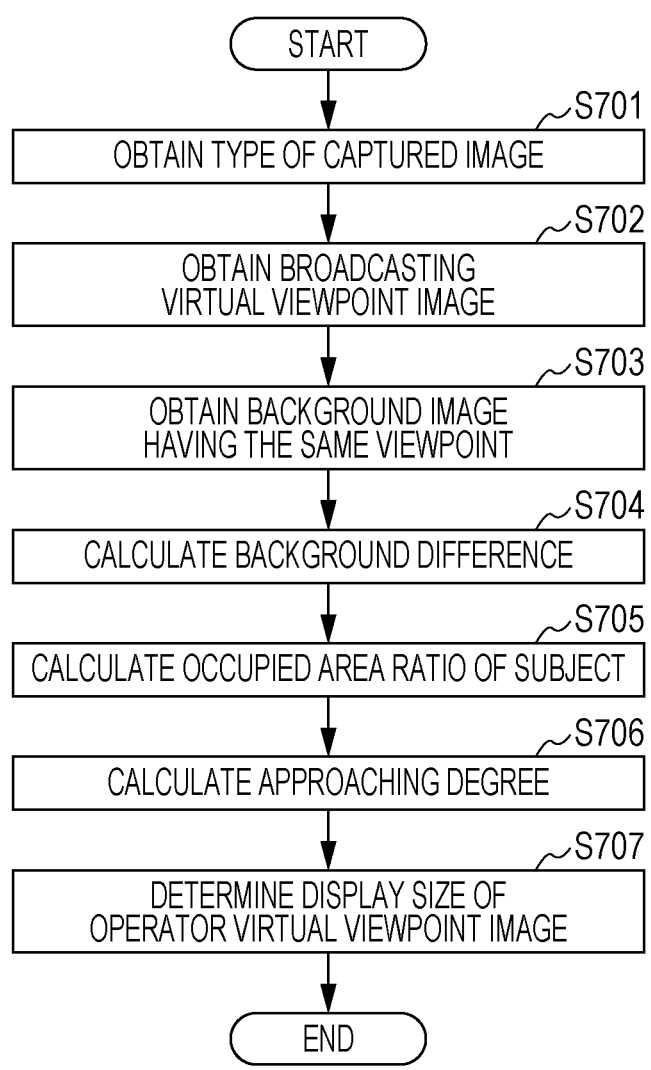
FIG. 7 is a flowchart of a display-size determination process according to the second embodiment.

FIG. 7 is a flowchart of the display size determination process (S601) illustrated in detail. In step S701, the image determination unit 302 determines a type of captured image, that is, a type of game. Examples of the type of game include soccer, rugby, baseball, and basketball. Note that, the image generation system including the display control apparatus 100 is applicable to fields other than sports, and therefore, examples of the type of captured image may include bridal, a concert, and a theatrical play. In such a case, the image determination unit 302 specifies content of bridal or a concert as the type of captured image.

In the display control apparatus 100, a game coefficient relative to an approaching degree is set to an HDD 104 or the like in advance for each type of game. Then the approaching degree calculator 301 specifies the game coefficient in accordance with the type of game. Here, the game coefficient is used for calculation of the approaching degree. For example, a game coefficient of 0.8 is assigned to soccer or rugby which is played in large fields, a game coefficient of 0.5 is assigned to basketball which is played in small fields, and a game coefficient of 0.3 is assigned to table tennis which is played in a much smaller field. Specifically, a larger game coefficient is set for a game in which a large area around an operator virtual viewpoint image is to be viewed, and otherwise, a smaller game coefficient is set.

In step S702, the background difference calculator 305 obtains the operator virtual viewpoint image which is held by the operator virtual viewpoint image holding unit 308. In step S703, the background image obtaining unit 303 obtains a background image having a virtual viewpoint which is the same as that of the operator virtual viewpoint image. As described above, background images in arbitrary virtual viewpoints may be generated by capturing a plurality of images using the imaging apparatus 109 before a game. As the virtual viewpoint, a virtual viewpoint which is held by the broadcasting virtual viewpoint holding unit 112 is used. A viewpoint output unit 117 transmits the virtual viewpoint to the image generation apparatus 110. The image generation apparatus 110 generates a virtual viewpoint image based on the background image captured in advance. The background image obtaining unit 303 obtains the background image of the virtual viewpoint generated by the image generation apparatus 110 through an image reception unit 115.

In step S704, the background difference calculator 305 obtains a difference between the operator virtual viewpoint image and the background image. In step S705, the occupied area ratio calculator 304 obtains a ratio of the background difference obtained by the background difference calculator 305 to a region of the operator virtual viewpoint image (an occupied area ratio). The background difference calculated by the background difference calculator 305 corresponds to a subject, such as a player or a ball, and a ratio of an area of a subject image to the operator virtual viewpoint image corresponds to the occupied area ratio.

In step S706, the approaching degree calculator 301 calculates an approaching degree in accordance with the game coefficient and the occupied area ratio. The approaching degree calculator 301 calculates the approaching degree in accordance with Expression 3 below, for example. When values in a range from 0 to 1 are set to the game coefficient and the occupied area ratio, a value of the approaching degree is also within a range from 0 to 1.

$$\text{Approaching Degree} = \text{Game Coefficient} * \text{Occupied Area Ratio} \quad \text{Expression 3}$$

In step S707, the display controller 116 determines a display size of the operator virtual viewpoint image based on the approaching degree. The process in step S707 will be described with reference to FIG. 8 and FIGS. 9A to 9E. A graph of FIG. 8 indicates the relationship between the approaching degree and the display size of the operator virtual viewpoint image. In FIG. 8, an axis of abscissas denotes the approaching degree and an axis of ordinates denotes the display size of the operator virtual viewpoint image. As entire trend of the graph, as the approaching degree is increased, the display size of the operator virtual viewpoint image is reduced. The display controller 116 determines the display size of the operator virtual viewpoint image based on the approaching degree in accordance with the graph (a function) illustrated in FIG. 8.

Figure 9A:
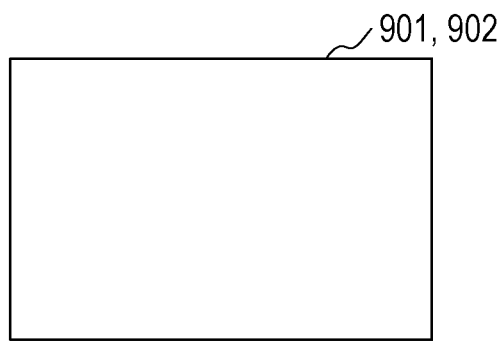
FIGS. 9A to 9E are diagrams illustrating the display-size determination process according to the second embodiment.

In the graph illustrated in FIG. 8, in a range of the approaching degree from 0 to 0.1, the display size of the operator virtual viewpoint image is equal to the display size of the extension virtual viewpoint image. In this case, as illustrated in FIG. 9A, display sizes of an operator virtual viewpoint image 901 and an extension virtual viewpoint image 902 are equal to each other. Specifically, the extension virtual viewpoint image 902 is not displayed. This occurs in a case of image capturing with a wide angle for capturing an entire field since the extension virtual viewpoint image 902 is not required.

Figure 9B:
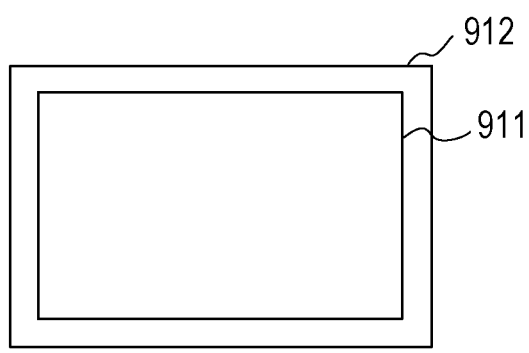

When the approaching degree is within a range from 0.1 to 0.2, the display size of the operator virtual viewpoint image is reduced as the approaching degree is increased. In this case, as illustrated in FIG. 9B, a display size of an operator virtual viewpoint image 911 is smaller than that of an extension virtual viewpoint image 912.

Figure 9C:
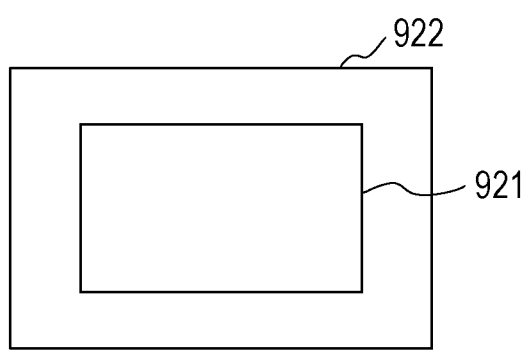

When the approaching degree is within a range from 0.2 to 0.7, the display size of the operator virtual viewpoint image is fixed irrespective of increase of the approaching degree. In this case, as illustrated in FIG. 9C, a ratio of a display size of an operator virtual viewpoint image 921 to a display size of an extension virtual viewpoint image 922 is much smaller than that illustrated in FIG. 9B. When the approaching degree is within a range from 0.7 to 0.8, the display size of the operator virtual viewpoint image is reduced as the approaching degree is increased. In this case, as illustrated in FIG. 9D, a ratio of a display size of an operator virtual viewpoint image 931 to a display size of an extension virtual viewpoint image 932 is much smaller than that in the state illustrated in FIG. 9C.

As described above, as the approaching degree is increased, a display space of the extension virtual viewpoint image is ensured by reducing the display size of the operator virtual viewpoint image. By this, the operator may easily notice a phenomenon which occurs around the operator virtual viewpoint image and may follow a sudden movement of a ball or a player.

When the approaching degree is within a range from 0.8 to 1.0, the display size of the operator virtual viewpoint image is fixed irrespective of increase of the approaching degree. In this case, as illustrated in FIG. 9E, a ratio of a display size of an operator virtual viewpoint image 941 to a display size of an extension virtual viewpoint image 942 is much smaller than that in the state illustrated in FIG. 9D. The display size is fixed in the range of the approaching degree from 0.8 to 1.0 so that a situation in which it is difficult for the operator to check an image since the display size is too small is avoided.

Figure 9D:
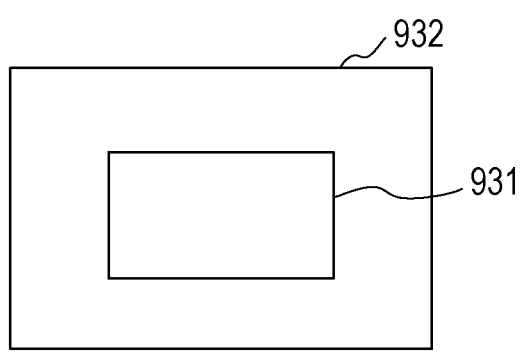
Figure 9E:
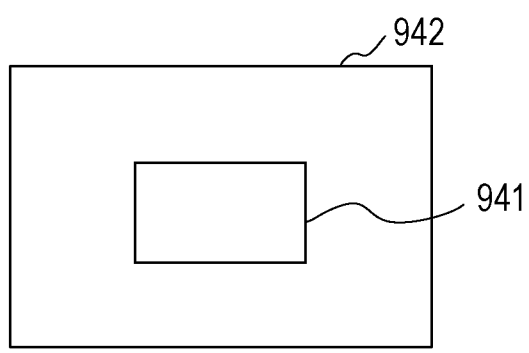

In the case of the angle for zooming up a player or the like, the angle of view of the extension virtual viewpoint image is comparatively large as illustrated in FIGS. 9D and 9E. Therefore, the operator easily notices a phenomenon which occurs around the operator virtual viewpoint image.

According to the first embodiment, the display size of the operator virtual viewpoint image is fixed and is a value corresponding to FIG. 9C, and values α and m are the same as those of the first embodiment. In this case, according to the second embodiment, the display size of the operator virtual viewpoint image becomes smaller than the display size l of the first embodiment as the approaching degree is increased. In Expression 1 of the first embodiment, "arctan" is a monotonically increasing function, and therefore, the angle of view β of the extension virtual viewpoint is larger than that of the first embodiment. Other configurations and other processes of the image generation system according to the second embodiment are the same as those of the first embodiment.

As described above, in the image generation system according to the second embodiment, the display size of the operator virtual viewpoint image which is displayed inside the extension virtual viewpoint image having the fixed display size may be appropriately changed as the situation demands. By this, a phenomenon which occurs around the operator virtual viewpoint image may be more reliably displayed.

Note that the process of calculating the approaching degree is not limited to the embodiment. As a first modification, a display control apparatus 100 may calculate an approaching degree based on an occupied area ratio without taking a type of game into consideration. Specifically, the display control apparatus 100 may determine a display size of an operator virtual viewpoint image based on the occupied area ratio.

As a second modification for the process of calculating an approaching degree, the display control apparatus 100 may calculate the approaching degree based on a distance between a subject and a virtual viewpoint. FIG. 10 is a flowchart of a detailed display size determination process (S601) according to the second modification.

In step S1001, the image determination unit 302 determines a type of game. In step S1002, a subject position obtaining unit 306 obtains a position of a subject. A general method is used to obtain the position of the subject. For example, a position of a player may be calculated using a position sensor attached to the player or using image recognition. Alternatively, a position of a center of a broadcasting virtual viewpoint image is converted into a world coordinate and the converted position may be used as a position of the subject.

Subsequently, in step S1003, the distance calculator 307 obtains a position of a virtual viewpoint from virtual viewpoint information held by a broadcasting virtual viewpoint holding unit 112. In step S1004, a distance calculator 307 calculates a distance between the position of the virtual viewpoint and the subject position based on the position of the virtual viewpoint and the subject position obtained by the subject position obtaining unit 306. The Euclidian distance of the world coordinate is used for the distance. In step S1005, an approaching degree calculator 301 obtains a zoom magnification. Note that the zoom magnification may be calculated using an angle of view which is held by the broadcasting virtual viewpoint holding unit 112. When the angle of view is large, the zoom magnification is small whereas when the angle of view is small, the zoom magnification is large.

In step S1006, the approaching degree calculator 301 calculates an approaching degree based on a game coefficient, a distance, and the zoom magnification. The approaching degree calculator 301 calculates an approaching degree which has been scaled in a range from 0 to 1 as illustrated in Expression 4 below.

Approaching Degree=(Game Coefficient)*zoom magnification/distance        Expression 4

The distance is in a denominator since the approaching degree is lowered as the distance is increased. In step S1007, the display controller 116 determines a display size of the operator virtual viewpoint image based on the approaching degree. This process is the same as that performed in step S707.

Figure 11:
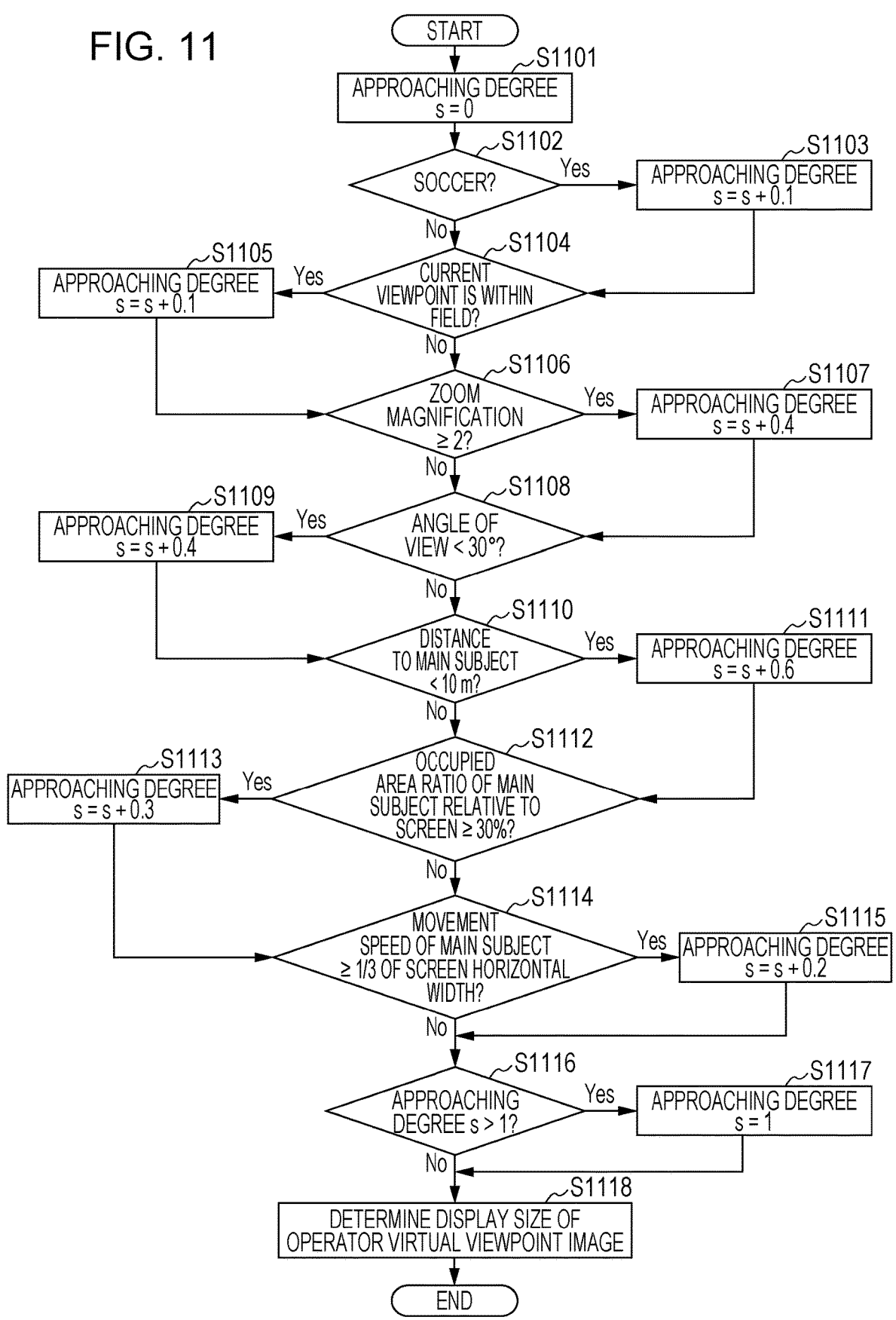
FIG. 11 is a flowchart of a display-size determination process according to a third modification.

As a third modification for the process of calculating an approaching degree, a display control apparatus 100 may calculate an approaching degree based on a plurality of factors. FIG. 11 is a flowchart of a detailed display size determination process (S601) according to the third modification. In the third modification, the approaching degree is calculated based on a type of game, a position of a virtual viewpoint, a zoom magnification, an angle of view, a distance between the virtual viewpoint and a subject, and a movement speed of the subject on an image which are examples of the plurality of factors. Note that the display control apparatus 100 may calculate the approaching degree based on at least one of the factors. As another example, the display control apparatus 100 may store values of the factors in addition to results of camera works which are past samples and obtain a rule using a statistical method, such as the quantification method I.

In step S1101, the approaching degree calculator 301 sets 0 to an approaching degree s. In step S1102, the image determination unit 302 obtains a type of game. When the type of game is soccer (Yes in step S1102), the image determination unit 302 proceeds to step S1103. When the type of game is not soccer (No in step S1102), the image determination unit 302 proceeds to step S1104.

In step S1103, the approaching degree calculator 301 sets "s+0.1" to the approaching degree s. In step S1104, the approaching degree calculator 301 obtains a position from the virtual viewpoint held by the broadcasting virtual viewpoint holding unit 112 so as to determine whether the position is within a field. When the position is within the field (Yes in step S1104), the approaching degree calculator 301 proceeds to step S1105. On the other hand, when the position is out of the field (No in step S1104), the approaching degree calculator 301 proceeds to step S1106. In step S1105, the approaching degree calculator 301 sets "s+0.1" to the approaching degree s.

In step S1106, the approaching degree calculator 301 obtains an angle of view from the broadcasting virtual viewpoint holding unit 112 and calculates a zoom magnification. When the zoom magnification is equal to or larger than 2 (Yes in step S1106), the approaching degree calculator 301 proceeds to step S1107. On the other hand, when the zoom magnification is smaller than 2 (No in step S1106), the approaching degree calculator 301 proceeds to step S1108. In step S1107, the approaching degree calculator 301 sets "s+0.4" to the approaching degree s. Subsequently, in step S1108, the approaching degree calculator 301 obtains an angle of view from the virtual viewpoint held by the broadcasting virtual viewpoint holding unit 112. When the angle of view is smaller than 30° (Yes in step S1108), the approaching degree calculator 301 proceeds to step S1109. When the angle of view is equal to or larger than 30° (No in step S1108), the approaching degree calculator 301 proceeds to step S1110. In step S1109, the approaching degree calculator 301 sets "s+0.4" to the approaching degree s.

In step S1110, the distance calculator 307 calculates a distance to the subject. Specifically, the distance calculator 307 performs a process the same as that performed in step S1002 to step S1004 described with reference to FIG. 10. When the distance is shorter than 10 m (Yes in step S1110), the distance calculator 307 proceeds to step S1111. When the distance is equal to or larger than 10 m (No in step S1110), the distance calculator 307 proceeds to step S1112. In step S1111, the approaching degree calculator 301 sets "s+0.6" to the approaching degree s.

In step S1112, the occupied area ratio calculator 304 calculates an occupied area ratio which is a ratio of the subject to an image. Specifically, the occupied area ratio calculator 304 performs a process the same as that performed in step S702 to step S705 described with reference to FIG. 7. When the occupied area ratio is equal to or larger than 30% (Yes in step S1112), the occupied area ratio calculator 304 proceeds to step S1113. When the occupied area ratio is smaller than 30% (No in step S1112), the occupied area ratio calculator 304 proceeds to step S1114.

In step S1113, the approaching degree calculator 301 sets "s+0.3" to the approaching degree s. In step S1114, the approaching degree calculator 301 calculates a distance of a movement of the subject in the operator virtual viewpoint image at a time of processing when compared with a preceding frame. Note that it is assumed here that the operator virtual viewpoint image (frame) at the time of processing and the operator virtual viewpoint image (frame) in the preceding frame are stored in the operator virtual viewpoint image holding unit 308. The approaching degree calculator 301 obtains the position of the subject from the subject position obtaining unit 306 and stores the obtained position of the subject at least for one frame.

Thereafter, the approaching degree calculator 301 obtains a position of the subject in the image using a position (in a world coordinate) of the subject. Since the virtual viewpoint of the image has been obtained, the position may be obtained by a simple geometric calculation. It is assumed here that a virtual viewpoint of a preceding frame and a virtual viewpoint at the time of the processing to be used are stored in the broadcasting virtual viewpoint holding unit 112. The approaching degree calculator 301 calculates a movement distance in the image for one frame using a 2D Euclidean distance, and the movement distance corresponds to a movement speed. When the movement speed is equal to or larger than one third of a horizontal width of the image (Yes in step S1114), the approaching degree calculator 301 proceeds to step S1115. When the movement speed is smaller than one third of the horizontal width of the image (No in step S1114), the approaching degree calculator 301 proceeds to step S1116. In step S1115, the approaching degree calculator 301 sets "s+0.2" to the approaching degree s.

In step S1116, the approaching degree calculator 301 performs a comparison using a value of the approaching degree. When the approaching degree s is larger than 1 (Yes in step S1116), the approaching degree calculator 301 proceeds to step S1117. When the approaching degree s is equal to or smaller than 1 (No in step S1116), the approaching degree calculator 301 proceeds to step S1118. In step S1117, the approaching degree calculator 301 sets 1.0 to the approaching degree s. In step S1118, the display controller 116 determines a display size of the operator virtual viewpoint image. This process is the same as that performed in step S707.

In this way, the display control apparatus 100 of this embodiment controls the display size of the operator virtual viewpoint image in accordance with a situation. Accordingly, the operator easily notices a phenomenon which occurs around the operator virtual viewpoint image even in the case of an angle of zooming up. Furthermore, visibility of the operator virtual viewpoint image may be enhanced in a case of a wide angle.

Third Embodiment

Next, an image generation system according to a third embodiment will be described. In an image generation system according to the third embodiment, a display control apparatus 100 simultaneously displays an operator virtual viewpoint image and an extension virtual viewpoint image which are obtained in different imaging time points (different imaging timings). The display control apparatus 100 of this embodiment simultaneously displays an operator virtual viewpoint image obtained from an image captured in a first time point and an extension virtual viewpoint image obtained from an image captured in a second time point which comes after the first time point. However, the relationship between the imaging time points are not limited to this embodiment as long as imaging time points corresponding to the images are different from each other.

Figure 12:
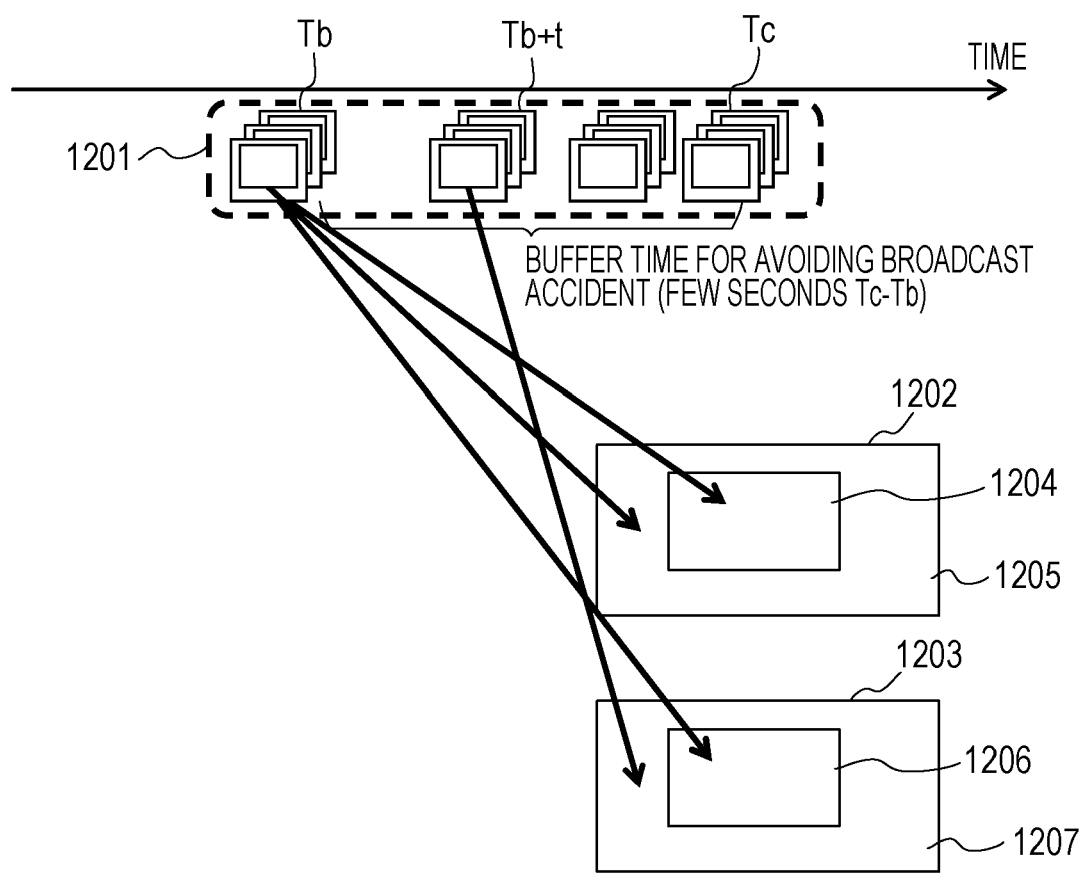
FIG. 12 is a diagram illustrating a process of generating a virtual viewpoint image for extension according to a third embodiment.

Hereinafter, the image generation system of the third embodiment will be described mainly in portions different from the image generation systems according to the other embodiments. FIG. 12 is a diagram illustrating a process of generating an extension virtual viewpoint image obtained in a time point which is advanced relative to an operator virtual viewpoint image. In general, a buffer time for a few seconds is provided after an imaging time point of an imaging apparatus 109 in the broadcasting system so that an image not to be broadcasted is not broadcasted in live broadcasting. When an imaging time is denoted by "Tb" and a certain time point is denoted by "Tc", a video captured at the time point Tb is broadcasted at the time point Tc at the time of processing. Specifically, a buffer time is represented by "Tc−Tb".

The image generation system of this embodiment uses this buffer time. Here, an image captured by the imaging apparatus 109 may be immediately used for generation of a virtual viewpoint image. Although a little time lag is generated in practice, the time lag is omitted in this embodiment for simplicity of description. The display control apparatuses 100 according to the first and second embodiments generate an operator virtual viewpoint image and an extension virtual viewpoint image based on an image captured at the imaging time Tb. On the other hand, the display control apparatus 100 of this embodiment may set a buffer time and use an image group 1201 including images which have been captured and stored in a period of time from the time point Tb to the time point Tc where the processing is performed.

In a region 1202, captured images used by an operator virtual viewpoint image and an extension virtual viewpoint image displayed on a setting screen for specifying a virtual viewpoint according to the first and second embodiments are indicated by arrow marks. An operator virtual viewpoint image 1204 and an extension virtual viewpoint image 1205 correspond to images captured at the time point Tb.

On the other hand, in a region 1203, captured images used by an operator virtual viewpoint image and an extension virtual viewpoint image displayed on the setting screen according to the this embodiment are indicated by arrow marks. An operator virtual viewpoint image 1206 corresponds to an image captured at the time point Tb and an extension virtual viewpoint image 1207 corresponds to an image captured at the time point Tb+t. In this way, in the image generation system employing the buffer time, images to be used for generation of the operator virtual viewpoint image and the extension virtual viewpoint image may be captured in different time points.

As described with reference to FIG. 12, when the operator virtual viewpoint image is determined as a reference, a phenomenon which occurs after a reference time (in the future) may be displayed in the extension virtual viewpoint image.

Specifically, the operator may recognize a phenomenon which occurs around the operator virtual viewpoint image in the near future, and notices a sudden movement of a ball or a player which is reliably happening in the near future before performing a camera work.

Figure 13:
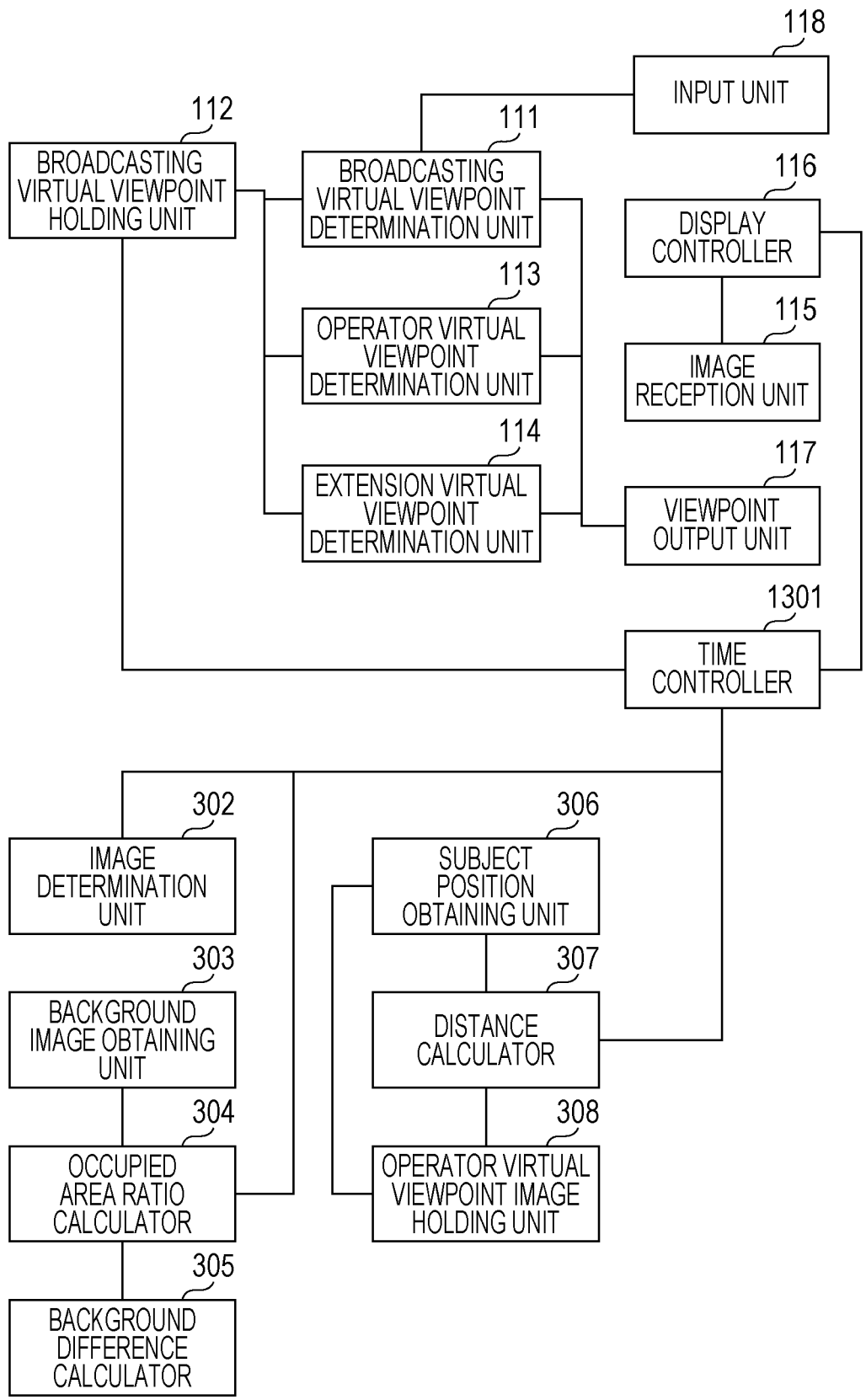
FIG. 13 is a functional configuration of a display control apparatus according to the third embodiment.

FIG. 13 is a functional configuration of the display control apparatus 100 according to the third embodiment.

The display control apparatus 100 of this embodiment includes a time controller 1301 instead of the approaching degree calculator 301 included in the functional configuration of the display control apparatus 100 according to the second embodiment described with reference to FIG. 5. The time controller 1301 determines a time to be advanced.

Figure 14:
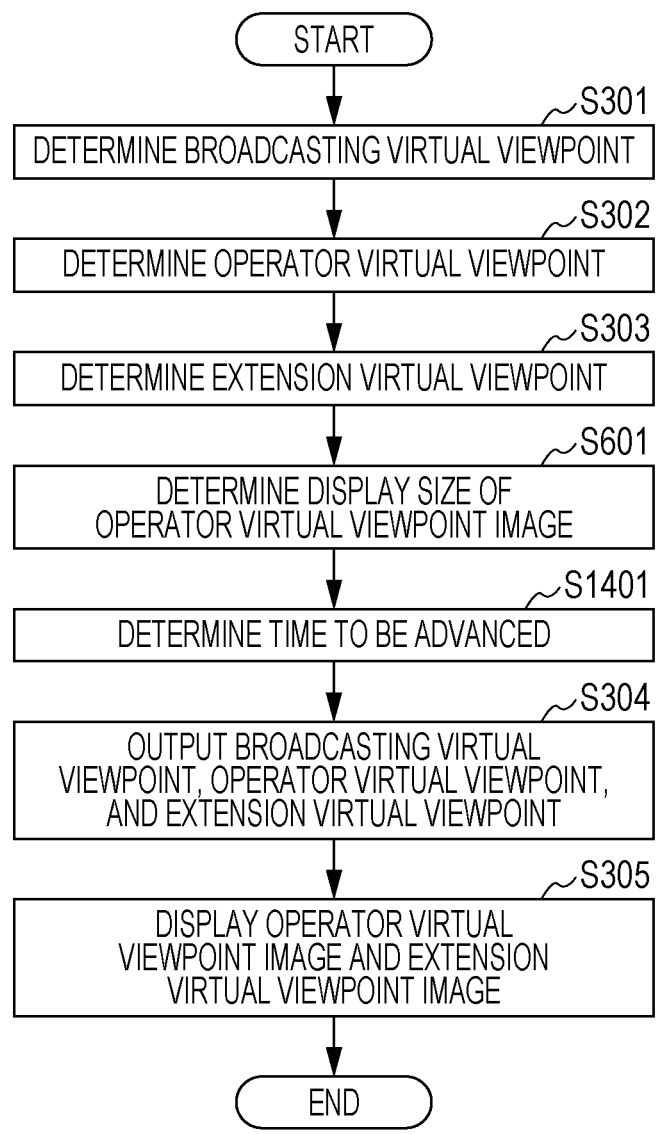
FIG. 14 is a flowchart of information processing according to the third embodiment.

FIG. 14 is a flowchart of information processing performed by the display control apparatus 100 according to the third embodiment. Processes which are the same as those illustrated in FIGS. 3 and 6 are denoted by reference numerals which are the same as those illustrated in FIGS. 3 and 6, and descriptions thereof are omitted. After a process in step S303, the CPU 101 proceeds to step S601, and thereafter, proceeds to step S1401. In step S1401, the time controller 1301 determines a time to be advanced. Alternatively the time to be advanced may be set in advance. Furthermore, the operator may input the time to be advanced through the operation unit 107. For example, a dial may be used as an input device. A setting may be performed on the input unit 118 such that a time is advanced when the dial is turned clockwise and a time is returned when the dial is turned anticlockwise. Accordingly, the user may input the time to be advanced using the dial. Note that any input device may be used and may be realized as a GUI using a touch panel or a mouse, for example.

In step S304, the viewpoint output unit 117 outputs the broadcasting virtual viewpoint, the operator virtual viewpoint, and the extension virtual viewpoint to the image generation apparatus 110. The viewpoint output unit 117 outputs information on the time to be advanced along with the extension virtual viewpoint image. The image generation apparatus 110 generates a broadcasting virtual viewpoint image, an operator virtual viewpoint image, and an extension virtual viewpoint image based on the broadcasting virtual viewpoint, the operator virtual viewpoint, and the extension virtual viewpoint and outputs the operator virtual viewpoint image and the extension virtual viewpoint image to the image reception unit 115. The image generation apparatus 110 selects a captured image to be used for a virtual viewpoint image generation based on the information on the time to be advanced when generating the extension virtual viewpoint image.

Figure 15:
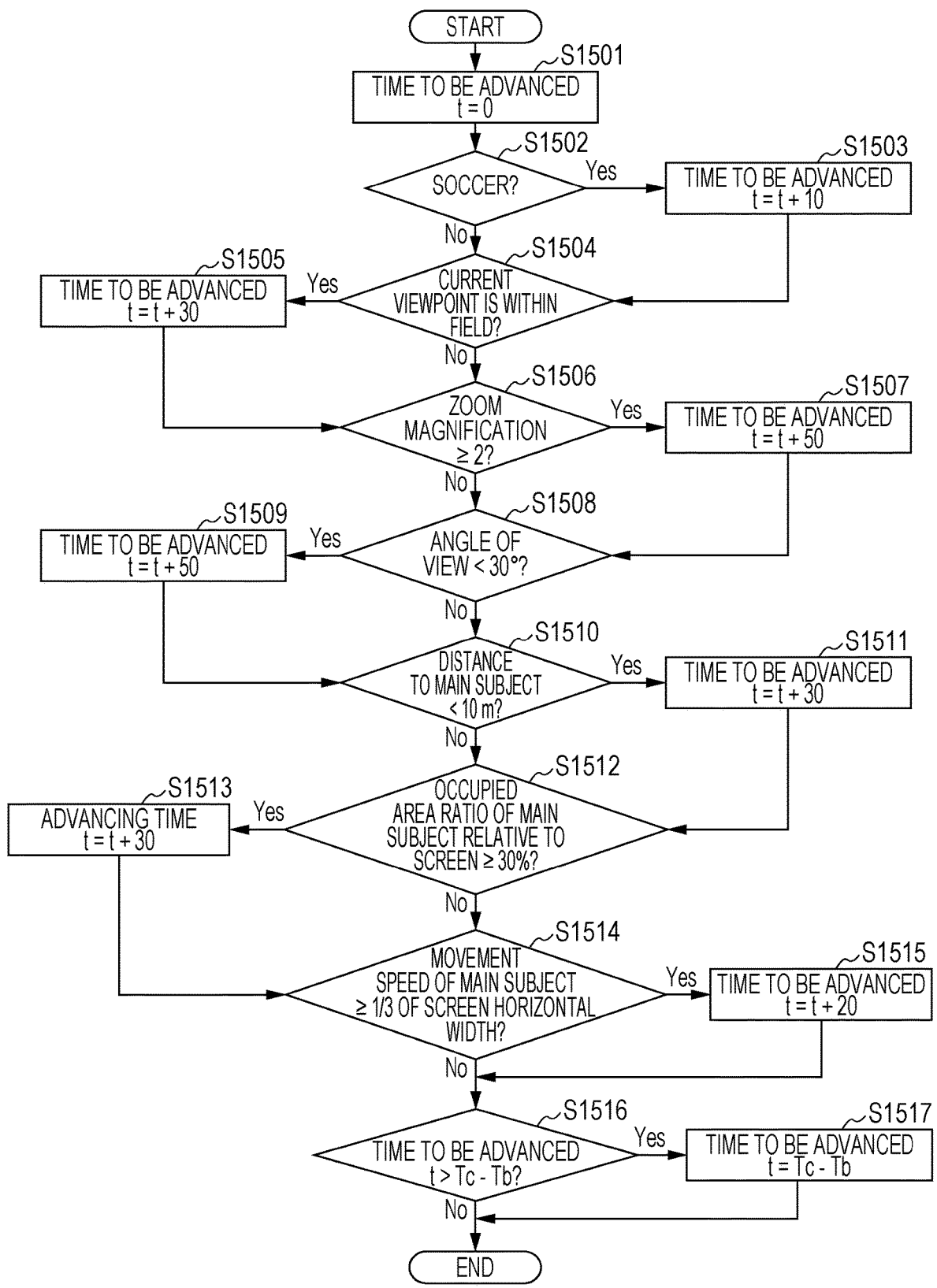
FIG. 15 is a flowchart of a process of determining a time to be advanced according to the third embodiment.

FIG. 15 is a flowchart of the process of determining the time to be advanced (S1401) illustrated in detail. The time controller 1301 determines a time to be advanced based on a plurality of factors. In this embodiment, the time controller 1301 determines a time to be advanced based on a type of game, a position of a virtual viewpoint, a zoom magnification, an angle of view, a distance between the virtual viewpoint and a subject, and a movement speed of a subject on an image. However, other factors may be used and it is not necessarily the case that all the factors are used. As another example, the display control apparatus 100 may store values of the factors in addition to results of camera works which are past samples and obtain a rule of the values using a statistical method, such as the quantification method I.

In step S1501, the time controller 1301 determines a time to be advanced (t=0 milliseconds). In step S1502, the image determination unit 302 obtains a type of game. When the type of game is soccer (Yes in step S1502), the image determination unit 302 proceeds to step S1503. When the type of game is not soccer (No in step S1502), the image determination unit 302 proceeds to step S1504. In step S1503, the time controller 1301 sets the time to be advanced as follows: t=t+10.

In step S1504, the time controller 1301 obtains a position from a virtual viewpoint held by a broadcasting virtual viewpoint holding unit 112 so as to determine whether the position is within a field. When the position is within the field (Yes in step S1504), the time controller 1301 proceeds to step S1505. When the position is not within the field (No in step S1504), the time controller 1301 proceeds to step S1506. In step S1505, the time controller 1301 determines a time to be advanced as follows: t=t+30. In step S1506, the time controller 1301 obtains an angle of view using the virtual viewpoint held by the broadcasting virtual viewpoint holding unit 112 and calculates a zoom magnification. When the zoom magnification is equal to or larger than 2 (Yes in step S1506), the time controller 1301 proceeds to step S1507. On the other hand, when the zoom magnification is smaller than 2 (No in step S1506), the time controller 1301 proceeds to step S1508. In step S1507, the time controller 1301 determines a time to be advanced as follows: t=t+50.

Subsequently, in step S1508, the time controller 1301 obtains an angle of view held by the broadcasting virtual viewpoint holding unit 112. When the angle of view is smaller than 30° (Yes in step S1508), the time controller 1301 proceeds to step S1509. When the angle of view is equal to or larger than 30° (No in step S1508), the time controller 1301 proceeds to step S1510. In step S1509, the time controller 1301 determines a time to be advanced as follows: t=t+50. In step S1510, the distance calculator 307 calculates a distance to the subject. This process is the same as that of step S1110 described with reference to FIG. 11. When the distance is shorter than 10 m (Yes in step S1510), the distance calculator 307 proceeds to step S1511. When the distance is equal to or longer than 10 m (No in step S1510), the distance calculator 307 proceeds to step S1512. In step S1511, the time controller 1301 determines a time to be advanced as follows: t=t+30.

In step S1512, the occupied area ratio calculator 304 calculates an occupied area ratio which is a ratio of the subject to an image. This process is the same as a process in step S1112 described with reference to FIG. 11. When the occupied area ratio is equal to or larger than 30% (Yes in step S1512), the occupied area ratio calculator 304 proceeds to step S1513. When the occupied area ratio is smaller than 30% (No in step S1512), the occupied area ratio calculator 304 proceeds to step S1514. In step S1513, the time controller 1301 determines a time to be advanced as follows: t=t+30. In step S1514, the time calculator 1301 calculates a movement distance of the subject. This process is the same as a process in step S1114 described with reference to FIG. 11. When the movement speed is equal to or larger than one third of a horizontal width of the image (Yes in step S1514), the time controller 1301 proceeds to step S1515. When the movement speed is smaller than one third of a horizontal width of the image (No in step S1514), the approaching degree calculator 301 proceeds to step S1516. In step S1515, the time controller 1301 determines a time to be advanced as follows: t=t+20.

In step S1516, the time controller 1301 performs a comparison of a value of the time to be advanced. When the time to be advance t is larger than Tc−Tb (Yes in step S1516), the time controller 1301 proceeds to step S1517. When the time to be advance t is equal to or smaller than Tc−Tb (No in step S1516), the time controller 1301 terminates the process. Note that Tc indicates a time point when the processing is performed, and Tb indicates an imaging time point of an image to be used for generation of the broadcasting virtual viewpoint image. In step S1517, the time controller 1301 determines a time to be advanced as follows: t=Tc−Tb. By this, the process of determining a time to be advanced is terminated. Other configurations and other processes of the image generation system according to the third embodiment are the same as those of the other embodiments.

As described above, in the image generation system according to the third embodiment, an extension virtual viewpoint image which is obtained from a captured image obtained at an imaging time point which is different from that of an operator virtual viewpoint image and the operator virtual viewpoint image are simultaneously displayed. By this, the operator may recognize a phenomenon which occurs at an imaging time point different from that of an operator virtual viewpoint image while recognizing the operator virtual viewpoint image.

Fourth Embodiment

Next, an image generation system according to a fourth embodiment will be described. Also in the image generation system according to the fourth embodiment, the display control apparatus 100 of this embodiment simultaneously displays an operator virtual viewpoint image obtained from an image captured in a first time point and an extension virtual viewpoint image obtained from an image captured in a second time point. However, the display control apparatus 100 of the fourth embodiment analyzes a plurality of extension virtual viewpoint images obtained by differently advancing time so as to determine one of the extension virtual viewpoint images to be displayed in a setting screen based on a result of a detection of a subject, such as a player or a ball.

Figure 16A:
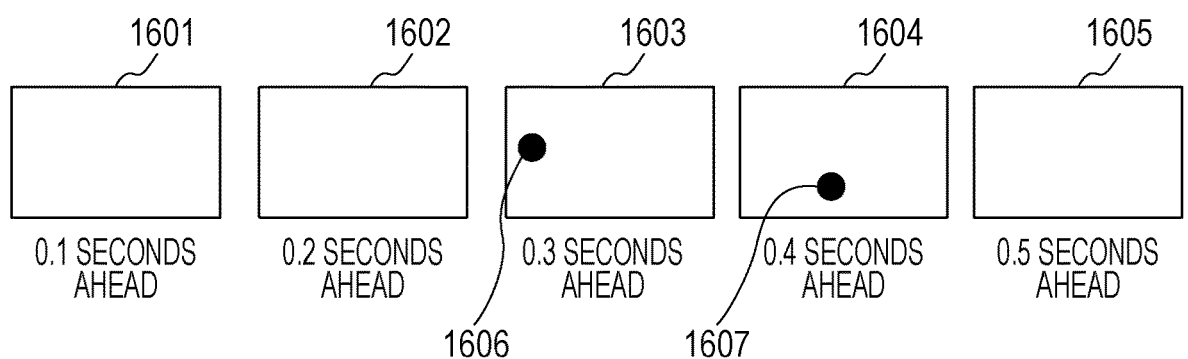
FIGS. 16A and 16B are diagrams illustrating the process of determining times to be advanced according to a fourth embodiment.
Figure 16B:
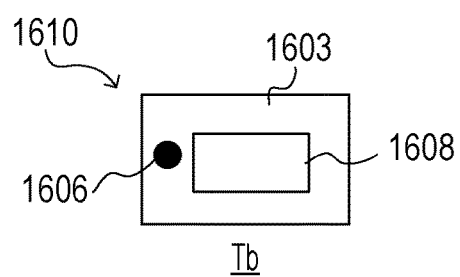

FIGS. 16A and 16B are diagrams illustrating a process of determining a time to be advanced based on a result of extraction of a player or a ball obtained by analyzing of extension virtual viewpoint images. FIG. 16A is a diagram illustrating extension virtual viewpoint images arranged in time series. An extension virtual viewpoint image 1601 is obtained at a time point Tb+0.1 (seconds). A virtual viewpoint is the same as an operator virtual viewpoint image at a time point Tb. Specifically, a future after 0.1 seconds is displayed for an operator. Similarly, extension virtual viewpoint images 1602 to 1605 are obtained in a range from a time point Tb+0.2 to a time point Tb+0.5.

Reference numerals 1606 and 1607 indicate a ball. The ball enters from a left side of the extension virtual viewpoint image and moves out from a lower side. Here, an extension virtual viewpoint image 1603 where the ball appears first is displayed in a setting screen. FIG. 16B is a diagram illustrating display of a setting screen 1610 at a time point Tb. An operator virtual viewpoint image 1608 is obtained at the time point Tb. An extension virtual viewpoint image 1603 is obtained at a time point Tb+0.3.

Figure 17:
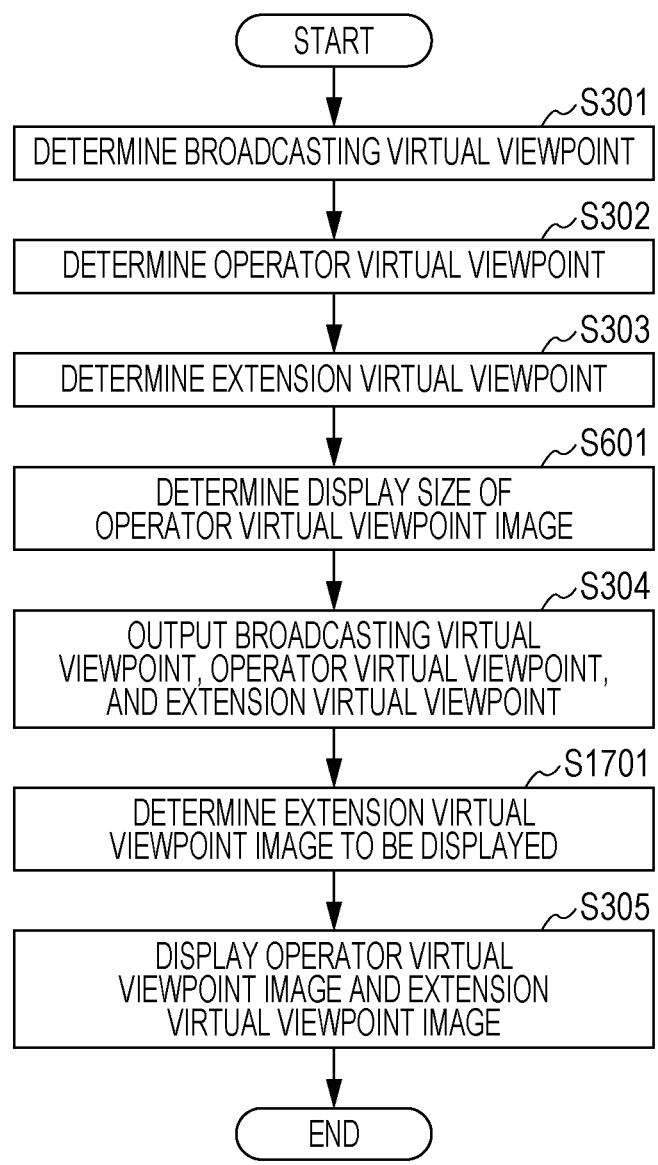
FIG. 17 is a flowchart of information processing according to the fourth embodiment.

FIG. 17 is a flowchart of information processing according to the fourth embodiment. Processes which are the same as those illustrated in FIG. 13 are denoted by reference numerals the same as those illustrated in FIG. 13, and descriptions thereof are omitted. The CPU 101 proceeds to step S601 after the process in step S601. Thereafter, the CPU 101 proceeds to step S304. In step S304, a viewpoint output unit 117 outputs a broadcasting virtual viewpoint, an operator virtual viewpoint, and an extension virtual viewpoint. Then the image generation apparatus 110 generates a virtual viewpoint image. Here, the viewpoint output unit 117 specifies time points in a period of time from the time point Tb to the time point Tc in an interval of 0.1 seconds, and the image generation apparatus 110 generates a plurality of extension virtual viewpoint images in an interval of 0.1 seconds. Note that the generated extension virtual viewpoint images are referred to as "candidate images". Note that a virtual viewpoint obtained at the time point Tb is used. Although the interval of 0.1 seconds is taken as an example in this embodiment, the present technique is not limited to this and an arbitrary interval may be specified.

After the process in step S304, the CPU 101 proceeds to step S1701. In step S1701, the subject position obtaining unit 306 detects a subject from the candidates images (the interval of 0.1 seconds) of the extension virtual viewpoint images generated in the period of time from the time point Tb to the time point Tc. The subject position obtaining unit 306 determines one of the candidate images in which the subject (a player or a ball) appears first in terms of time as an extension virtual viewpoint image to be displayed on the setting screen (an image determination process), and thereafter, proceeds to step S305. Other configurations and other processes of the image generation system according to the fourth embodiment are the same as those of the other embodiments.

As described above, in the image generation system according to the fourth embodiment, an extension virtual viewpoint image corresponding to an appropriate imaging time point may be displayed simultaneously with an operator virtual viewpoint image. By this, the operator may recognize a phenomenon which occurs at an imaging time point different from that of an operator virtual viewpoint image while recognizing the operator virtual viewpoint image.

Although one of extension virtual viewpoint images is selected and displayed in the example described above, an arbitrary number of extension virtual viewpoint images may be displayed simultaneously with an operator virtual viewpoint image.

Figure 18:
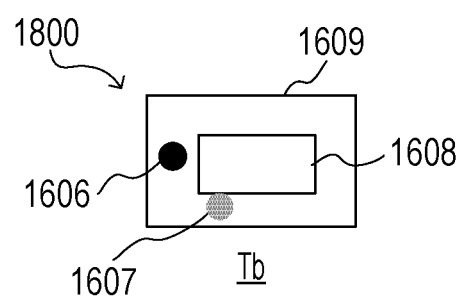
FIG. 18 is a diagram illustrating display of a setting screen according to the fourth embodiment.

FIG. 18 is a diagram illustrating display of a setting screen 1800 displaying an image 1609 including extension virtual viewpoint images 1603 and 1604 of FIG. 16A which include the subject and which overlap with each other. Here, the subject in a further future is displayed thin so that a temporal difference is expressed. A method for expressing a temporal difference is not limited to this, and a temporal difference may be expressed by an arbitrary method, such as an alfa value, a character, or color.

Also in this case, information processing performed by the display control apparatus 100 is basically the same as that described in the fourth embodiment with reference to FIG. 17. However, the information processing is different from that of the fourth embodiment in the following two points. First, in step S1701, a subject position obtaining unit 306 selects all extension virtual viewpoint images which include the subject. Second, in step S305, a display controller 116 displays a plurality of extension virtual viewpoint images including the subject in an overlapping manner along with an operator virtual viewpoint image.

Furthermore, although a display size of an operator virtual viewpoint image is determined in step S601 according to this embodiment, this process may be omitted so that the display size is not controlled.

As described above, according to the foregoing embodiments, the operator less misses shooting of a subject at a time of operation of a virtual viewpoint, and a smooth camerawork may be realized. Furthermore, according to the foregoing embodiments, an extension virtual viewpoint is automatically determined based on a broadcasting virtual viewpoint. Accordingly, since the display control apparatus 100 does not separately receive an input for determining an extension virtual viewpoint from an operator, a virtual viewpoint image corresponding to the extension virtual viewpoint may be displayed for the user while a load of processing on an input for determining an extension virtual viewpoint is reduced. Furthermore, according to the foregoing embodiments, an extension virtual viewpoint for reducing the possibility that a specific object is missed is automatically determined based on the broadcasting virtual viewpoint, and a virtual viewpoint image corresponding to the extension virtual viewpoint is displayed for the operator. Specifically, the display control apparatus 100 may reduce the possibility that a specific object is missed by displaying a virtual viewpoint image corresponding to the extension virtual viewpoint by combining a plurality of virtual viewpoint images obtained from various directions without following a movement of the specific subject. Accordingly, the display control apparatus 100 may perform display which attains reduction of the possibility that a specific object is missed without receiving a large number of virtual viewpoint images which require a large number of processes and communications. Furthermore, according to the foregoing embodiments, an extension virtual viewpoint is determined by enlarging an angle of view just suitable for reducing the possibility that a specific object is missed. Therefore, according to the foregoing embodiments, in generation of a virtual viewpoint image required for processing on a larger number of captured images as an angle of view is enlarged, by setting an extension virtual viewpoint by enlarging a certain angle of view relative to a broadcasting virtual viewpoint, display which attains reduction of the possibility that a specific object is missed may be performed without excessively increasing a processing load. Furthermore, according to the foregoing embodiments, instead of a virtual viewpoint image which has a large angle of view for overviewing an imaging target and which requires processing on a larger number of captured images, a virtual viewpoint image which has an object region common to the broadcasting virtual viewpoint and which corresponds to an extension virtual viewpoint obtained by enlarging a certain angle of view relative to the broadcasting virtual viewpoint is generated and displayed. Accordingly, display which attains reduction of the possibility that a specific object is missed may be performed without excessively increasing a processing load of generation of the virtual viewpoint image and a communication load of communication of the virtual viewpoint image.

Although the preferred embodiments of the present technique have been described hereinabove, the present technique is not limited to the specific embodiments and various modifications and changes may be made within the scope of the present technique described in claims.

Other Embodiments

Although the embodiments of the present technique have been described hereinabove, the display control apparatus may not take broadcasting into consideration. For example, the display control apparatus may determine a virtual viewpoint for content instead of a broadcasting virtual viewpoint image when a general user generates video content to be uploaded to an SNS (Social Network Service). Furthermore, in this case, the video content may not be output to a broadcasting system, and may be stored in a personal computer used by a user or uploaded to an SNS server.

As described above, the display control apparatus is a general-purpose display control apparatus, such as a general personal computer, and is realized by computer programs operating in the apparatus. Therefore, the present technique obviously includes the computer programs. The present technique may be realized when a program which realizes at least one of the functions of the foregoing embodiments is supplied to a system or an apparatus through a network or a storage medium and at least one processor included in a computer of the system or the apparatus reads and executes the program. Furthermore, the present technique may be realized by a circuit which realizes at least one of the functions (application specific integrated circuits (ASIC)).

According to this embodiment, the possibility that an operator who sets a virtual viewpoint loses sight of a specific object may be reduced.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-170932 filed Sep. 1, 2016, which is hereby incorporated by reference herein in its entirety.

What is claimed is:

1. A display control apparatus comprising:
one or more hardware processors; and
one or more memories which store instructions executable by the one or more hardware processors to cause the display control apparatus to perform at least:
receiving an input according to user operation by an operator for designating a virtual viewpoint and a view direction from the virtual viewpoint corresponding to a virtual viewpoint image which is generated based on a plurality of captured images of a capturing target area captured by a plurality of image capturing apparatuses in accordance with the designated virtual viewpoint and view direction from the virtual viewpoint;
outputting, to a system for opening an image to an audience, an audience virtual viewpoint image corresponding to the virtual viewpoint image of a first area according to the designated virtual viewpoint and view direction from the virtual viewpoint;
determining a time to be advanced for the virtual viewpoint image corresponding to a surrounding area of the first area; and
causing an operation screen for the user operation to display an operation virtual viewpoint image including both the audience virtual viewpoint image based on a predetermined time and the virtual viewpoint image corresponding to the surrounding area of the first area based on a time advanced the determined time from the predetermined time, such that a positional relationship between the first area and the surrounding area is identifiably represented in the operation virtual viewpoint image displayed on the operation screen,
wherein the operation virtual viewpoint image and the audience virtual viewpoint image included in the operation virtual viewpoint image are defined by a common virtual viewpoint and view direction from the virtual viewpoint,
wherein the virtual viewpoint image corresponding to the surrounding area of the first area and the audience virtual viewpoint image are displayed concurrently, and
wherein the audience virtual viewpoint image is output to the system but the virtual viewpoint image corresponding to the surrounding area is not output to the system.

2. The display control apparatus according to claim 1, wherein a center position of the audience virtual viewpoint image and a center positon of the operation virtual viewpoint image coincide with each other.

3. The display control apparatus according to claim 1, wherein the instructions further cause the display control apparatus to perform:

cause the display control apparatus to perform determining an angle of view corresponding to the operation virtual viewpoint image based on an angle of view corresponding to the audience virtual viewpoint image, and wherein the operation virtual viewpoint image and the audience virtual viewpoint image depend on the virtual viewpoint, the view direction from the virtual viewpoint, and angle of view of the virtual viewpoint.

4. The display control apparatus according to claim 3, wherein the angle of view corresponding to the operation virtual viewpoint image is determined further based on a display size of the operation virtual viewpoint image on the display screen.

5. The display control apparatus according to claim 1, wherein the instructions further cause the display control apparatus to perform:
   specifying an occupied area ratio of an object in the audience virtual viewpoint image; and
   determining a display size of the operation virtual viewpoint image on the display screen based on the occupied area ratio.

6. The display control apparatus according to claim 5, wherein the display size is determined based on a type of the plurality of captured images.

7. The display control apparatus according to claim 1, wherein the instructions further cause the display control apparatus to perform:
   specifying a distance between a virtual viewpoint and a position of an object in the audience virtual viewpoint image; and
   determining a display size of the operation virtual viewpoint image on the display screen based on the distance.

8. The display control apparatus according to claim 1, wherein the instructions further cause the display control apparatus to perform:
   specifying a moving speed of an object in the audience virtual viewpoint image; and
   determining a display size of the operation virtual viewpoint image on the display screen based on the movement speed.

9. The display control apparatus according to claim 1, wherein a first part of the operation virtual viewpoint image corresponding to the audience virtual viewpoint image is generated based on captured images captured at a timing different from a timing when captured images used for generating a second part of the operation virtual viewpoint image corresponding to the surrounding area are captured.

10. The display control apparatus according to claim 9, wherein the second part of the operation virtual viewpoint image is generated based on captured images captured at a timing after a timing when captured images used for generating the first part of the operation virtual viewpoint image are captured.

11. The display control apparatus according to claim 9, wherein the instructions further cause the display control apparatus to perform:
   detecting an object from a plurality of candidate images of the second part of the operation virtual viewpoint image which are generated based on captured images captured at timings different from a timing when captured images used for generating the first part of the operation virtual viewpoint image are captured; and
   selecting one of the plurality of candidate images to be displayed based on a result of the detecting.

12. The display control apparatus according to claim 9, wherein the second part of the operation virtual viewpoint image is generated by overlaying a plurality of virtual viewpoint images of the surrounding area corresponding to different captured images captured at different timings.

13. The display control apparatus according to claim 1, wherein the instructions further cause the display control apparatus to generate the operation virtual viewpoint image and the audience virtual viewpoint image using the plurality of captured images.

14. The display control apparatus according to claim 1, wherein the operation virtual viewpoint image includes a region which is not included in the audience virtual viewpoint image.

15. The display control apparatus according to claim 1, wherein a boundary line indicating a position of the audience virtual viewpoint image is displayed on the operation virtual viewpoint image on the operation screen.

16. The display control apparatus according to claim 1, wherein the audience virtual viewpoint image is output for broadcasting.

17. The display control apparatus according to claim 1, wherein the instructions further cause the display control apparatus to perform:
   determining the virtual viewpoint image corresponding to the surrounding area of the first area based on a plurality of captured images arranged in time series,
   wherein the operation virtual viewpoint image including both the audience virtual viewpoint image and the determined virtual viewpoint image corresponding to the surrounding area of the first area.

18. A display control method comprising:
   receiving an input according to user operation by an operator for designating a virtual viewpoint and a view direction from the virtual viewpoint corresponding to a virtual viewpoint image which is generated based on a plurality of captured images of a capturing target area captured by a plurality of image capturing apparatuses in accordance with the designated virtual viewpoint and view direction from the virtual viewpoint;
   outputting, to a system for opening an image to an audience, an audience virtual viewpoint image corresponding to the virtual viewpoint image of a first area according to the designated virtual viewpoint and view direction from the virtual viewpoint;
   determining a time to be advanced for the virtual viewpoint image corresponding to a surrounding area of the first area; and
   causing an operation screen for the user operation to display an operation virtual viewpoint image including both the audience virtual viewpoint image based on a predetermined time and the virtual viewpoint image corresponding to the surrounding area of the first area based on a time advanced the determined time from the predetermined time, such that a positional relationship between the first area and the surrounding area is identifiably represented in the operation virtual viewpoint image displayed on the operation screen wherein the operation virtual viewpoint image and the audience virtual viewpoint image included in the operation virtual viewpoint image are defined by a common virtual viewpoint and view direction from the virtual viewpoint,
   wherein the virtual viewpoint image corresponding to the surrounding area of the first area and the audience virtual viewpoint image are displayed concurrently, and wherein the audience virtual viewpoint image is output to the system but the virtual viewpoint image corresponding to the surrounding area is not output to the system.

19. A non-transitory computer-readable storage medium which stores a program which causes a computer to execute a display control method comprising:
   receiving an input according to user operation by an operator for designating a virtual viewpoint and a view direction from the virtual viewpoint corresponding to a virtual viewpoint image which is generated based on a plurality of captured images of a capturing target area captured by a plurality of image capturing apparatuses in accordance with the designated virtual viewpoint and view direction from the virtual viewpoint;
   outputting, to a system for opening an image to an audience, an audience virtual viewpoint image corresponding to the virtual viewpoint image of a first area according to the designated virtual viewpoint and view direction from the virtual viewpoint;
   determining a time to be advanced for the virtual viewpoint image corresponding to a surrounding area of the first area; and
   causing an operation screen for the user operation to display an operation virtual viewpoint image including both the audience virtual viewpoint image based on a predetermined time and the virtual viewpoint image corresponding to the surrounding area of the first area based on a time advanced the determined time from the predetermined time, such that a positional relationship between the first area and the surrounding area is identifiably represented in the operation virtual viewpoint image displayed on the operation screen
   wherein the operation virtual viewpoint image and the audience virtual viewpoint image included in the operation virtual viewpoint image are defined by a common virtual viewpoint and view direction from the virtual viewpoint,
   wherein the virtual viewpoint image corresponding to the surrounding area of the first area and the audience virtual viewpoint image are displayed concurrently, and
   wherein the audience virtual viewpoint image is output to the system but the virtual viewpoint image corresponding to the surrounding area is not output to the system.

* * * * *